US012542352B2

(12) United States Patent
Ai et al.

(10) Patent No.: US 12,542,352 B2
(45) Date of Patent: Feb. 3, 2026

(54) GROUND-TO-AIR ANTENNAS HAVING MULTI-STAGE BEAMFORMING NETWORKS, AND RELATED METHODS OF OPERATING SUCH ANTENNAS

(71) Applicant: Outdoor Wireless Networks LLC, Claremont, NC (US)

(72) Inventors: Xiangyang Ai, Plano, TX (US); Chengcheng Tang, Murphy, TX (US); Martin L. Zimmerman, Chicago, IL (US); Kamalakar Yeddula, Nandyala (IN); Kumara Swamy Kasani, Godavarikhani (IN); Sharal Dhanapal, Visakhapatnam (IN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 279 days.

(21) Appl. No.: 18/451,177

(22) Filed: Aug. 17, 2023

(65) Prior Publication Data

US 2024/0072438 A1 Feb. 29, 2024

Related U.S. Application Data

(60) Provisional application No. 63/373,482, filed on Aug. 25, 2022.

(51) Int. Cl.
*H01Q 3/40* (2006.01)
*H01Q 19/10* (2006.01)

(52) U.S. Cl.
CPC ............... *H01Q 3/40* (2013.01); *H01Q 19/10* (2013.01)

(58) Field of Classification Search
CPC ........ H01Q 3/40; H01Q 19/10; H01Q 19/108; H01Q 21/24; H01Q 3/2635; H01Q 25/004; H01Q 25/007; H04B 7/0421; H04B 7/0617
See application file for complete search history.

(56) References Cited

U.S. PATENT DOCUMENTS 3,731,316 A * 5/1973 Sheleg .................... H01Q 3/40 343/778
3,736,592 A * 5/1973 Coleman ................ H01Q 3/40 343/777
3,997,900 A * 12/1976 Chin ................... H01Q 25/004 343/705
4,338,605 A * 7/1982 Mims .................. H01Q 3/2635 342/373

(Continued)

FOREIGN PATENT DOCUMENTS

CN 206498392 U * 9/2017 .............. H04B 1/40

*Primary Examiner* — Bernarr E Gregory
(74) *Attorney, Agent, or Firm* — Myers Bigel, P.A.

(57) ABSTRACT

Antennas are provided. An antenna includes an antenna array having a plurality of sub-arrays that each include a plurality of radiating elements. Moreover, the antenna includes a multi-stage beamforming network having a first stage including a plurality of first Butler matrices and a second stage including a plurality of second Butler matrices that are coupled between the first Butler matrices and the sub-arrays. The first Butler matrices are each coupled to each of the second Butler matrices. The second Butler matrices are coupled to the sub-arrays, respectively, without any cables between the second Butler matrices and the sub-arrays.

19 Claims, 29 Drawing Sheets

(56) References Cited

U.S. PATENT DOCUMENTS

| | | | | | |
|---|---|---|---|---|---|
| 4,652,879 | A * | 3/1987 | Rudish | H01Q 3/40 342/373 |
| 5,410,320 | A * | 4/1995 | Rudish | H01Q 3/40 342/368 |
| 5,430,453 | A * | 7/1995 | Rudish | H01Q 3/40 342/373 |
| 5,493,306 | A * | 2/1996 | Rudish | H01Q 3/40 342/372 |
| 8,497,743 | B2 * | 7/2013 | Dent | H01Q 25/007 333/24 C |
| 11,114,759 | B1 * | 9/2021 | Horn | H04B 7/0617 |
| 11,923,619 | B2 * | 3/2024 | Horn | H04B 7/0421 |
| 2004/0160374 | A1 * | 8/2004 | Johansson | H01Q 3/40 343/757 |

* cited by examiner

GROUND-TO-AIR ANTENNAS HAVING MULTI-STAGE BEAMFORMING NETWORKS, AND RELATED METHODS OF OPERATING SUCH ANTENNAS

CROSS-REFERENCE TO RELATED APPLICATION(S)

This application claims priority under 35 U.S.C. § 119 to U.S. Provisional Application No. 63/373,482, filed on Aug. 25, 2022, the disclosure of which is hereby incorporated by reference herein in its entirety.

FIELD

The present invention generally relates to radio communications and, more particularly, to beamforming networks for ground-to-air antennas.

BACKGROUND

Ground-to-air antenna systems are well known in the art. A ground-to-air antenna system may include an antenna that is configured to provide two-way radio frequency ("RF") communications. Such an antenna may be, for example, a multibeam antenna that simultaneously generates a plurality of antenna beams, such as by using a beamforming network having a plurality of Butler matrices. Unfortunately, however, such an antenna may also be bulky.

SUMMARY

An antenna, according to some embodiments, may include an antenna array having a plurality of sub-arrays that each comprise a plurality of radiating elements. The antenna may include a multi-stage beamforming network having a first stage comprising a plurality of first Butler matrices and a second stage comprising a plurality of second Butler matrices that are coupled between the first Butler matrices and the sub-arrays. The first Butler matrices may each be coupled to each of the second Butler matrices. Moreover, the second Butler matrices may be coupled to the sub-arrays, respectively, without any cables between the second Butler matrices and the sub-arrays.

In some embodiments, the multi-stage beamforming network may have fewer of the first Butler matrices than the second Butler matrices. Moreover, each of the second Butler matrices may have an outermost input that is coupled to a resistive load.

According to some embodiments, the antenna may include a flat reflector. The antenna array may be on a first surface of the flat reflector. The multi-stage beamforming network may be on a second surface of the flat reflector that is opposite the first surface. The first Butler matrices may be on respective first printed circuit boards ("PCBs") that are parallel or perpendicular to the second surface of the flat reflector. The second Butler matrices may be on respective second PCBs that are perpendicular to the second surface of the flat reflector. Moreover, the first PCBs may be coupled to the second PCBs by solder or by blind-mate connections.

In some embodiments, the antenna array may be configured to provide ground-to-air communications.

According to some embodiments, the antenna array may be a first antenna array, the sub-arrays may be first sub-arrays, the radiating elements may be first-band radiating elements, and the multi-stage beamforming network may be a first multi-stage beamforming network. Moreover, the antenna may include: a second antenna array having a plurality of second sub-arrays that each include a plurality of second-band radiating elements; and a second multi-stage beamforming network including a plurality of third Butler matrices and a plurality of fourth Butler matrices coupled between the third Butler matrices and the second sub-arrays.

In some embodiments, the antenna may include a flat reflector, and the first and second antenna arrays may each be on the flat reflector. For example, a first of the second sub-arrays may be between a first and a second of the first sub-arrays on the flat reflector. Moreover, the flat reflector may have a length of 1,200 millimeters ("mm") or shorter and a width of 865 mm or shorter.

According to some embodiments, the second antenna array may be configured to provide an equal number of antenna beams as the first antenna array.

In some embodiments, the first through fourth Butler matrices may be first-polarization Butler matrices. Moreover, the antenna may include a plurality of second-polarization Butler matrices including: a plurality of fifth Butler matrices and a plurality of sixth Butler matrices coupled between the fifth Butler matrices and the first sub-arrays; and a plurality of seventh Butler matrices and a plurality of eighth Butler matrices coupled between the seventh Butler matrices and the second sub-arrays.

A method of operating an antenna, according to some embodiments, may include providing ground-to-air communications via an antenna array of the antenna that is coupled to a multi-stage beamforming network. For example, the ground-to-air communications comprise multi-band communications.

In some embodiments, the antenna array may have a plurality of sub-arrays that each include a plurality of radiating elements on a flat reflector of the antenna. The multi-stage beamforming network may have a first stage including a plurality of first Butler matrices and a second stage including a plurality of second Butler matrices that are coupled between the first Butler matrices and the sub-arrays. The first Butler matrices may each be coupled to each of the second Butler matrices. The second Butler matrices may each be coupled to the sub-arrays, respectively, without any cables between the second Butler matrices and the sub-arrays.

According to some embodiments, the antenna may be a multi-band ground-to-air antenna and the antenna array may be a first antenna array. Providing the ground-to-air communications may include providing N×N antenna beams per polarization in a first frequency band via the first antenna array. Moreover, the method may include providing N×N antenna beams per polarization in a second frequency band via a second antenna array, and N may be an integer including 5 or higher.

An antenna, according to some embodiments, may include a flat reflector. The antenna may include an antenna array having a plurality of sub-arrays that each include a plurality of radiating elements on a first surface of the flat reflector. Moreover, the antenna may include a multi-stage beamforming network on a second surface of the flat reflector that is opposite the first surface. The multi-stage beamforming network may have a first stage including a plurality of first Butler matrices and a second stage including a plurality of second Butler matrices that are coupled between the first Butler matrices and the sub-arrays. The first Butler matrices may be on respective first PCBs that are parallel or perpendicular to the second surface of the flat reflector.

Moreover, the second Butler matrices may be on respective second PCBs that are perpendicular to the second surface of the flat reflector.

In some embodiments, the first PCBs may be coupled to the second PCBs by solder or by blind-mate connections.

According to some embodiments, the second PCBs may be stacked with each other in a first direction parallel to the second surface of the flat reflector. Moreover, the first PCBs may be stacked with each other in a second direction parallel to the second surface of the flat reflector and perpendicular to the first direction.

An antenna, according to some embodiments, may include an antenna array having a plurality of sub-arrays that each include a plurality of radiating elements. The antenna may include a multi-stage beamforming network having a first stage including a plurality of first Butler matrices and a second stage including a plurality of second Butler matrices that are coupled between the first Butler matrices and the sub-arrays. The first Butler matrices may each be coupled to each of the second Butler matrices. Moreover, the multi-stage beamforming network may have fewer of the first Butler matrices than the second Butler matrices.

In some embodiments, the antenna may be a multi-band ground-to-air antenna.

DETAILED DESCRIPTION

A multibeam antenna refers to an antenna that can simultaneously generate a plurality of antenna beams. Multibeam antennas are often formed using beamforming networks having a plurality of Butler matrices that feed an array of radiating elements. Each multibeam antenna may be very bulky due to, for example, a slanted (e.g., pyramid-shaped) reflector that faces in four different directions and/or various cables (e.g., dozens or hundreds of cables) that connect the Butler matrices to the array and/or to each other.

Multibeam antennas according to embodiments of the present invention, however, may achieve a significantly smaller size and weight by using a flat reflector and/or fewer cables. For example, a multi-stage beamforming network according to some embodiments may include a first stage and a second stage that is between the first stage and an array of radiating elements, where the second stage is coupled to the array without any cables therebetween. As an example, the second stage may include one or more PCBs that extend through a reflector to be coupled to the array. Moreover, the PCB(s) of the second stage may be coupled to one or more PCBs of the first stage without any cables therebetween, such as by using solder or blind-mate connectors.

In some embodiments, a multibeam antenna may provide ground-to-air communications. Accordingly, an array of radiating elements on a flat reflector that is flat on the ground may extend upward from the flat reflector toward the sky (e.g., perpendicular to the ground/horizon). A radio that is coupled to the antenna may select an antenna beam for transmission.

According to some embodiments, the antenna may provide thirty-six antenna beams that cover one of four sectors. Any number of the thirty-six antenna beams can be active at a given time. In other embodiments, the antenna may provide a different number of antenna beams, such as twenty-five or sixty-four antenna beams.

Example embodiments of the present invention will be described in greater detail with reference to the attached figures.

Figure 1A:
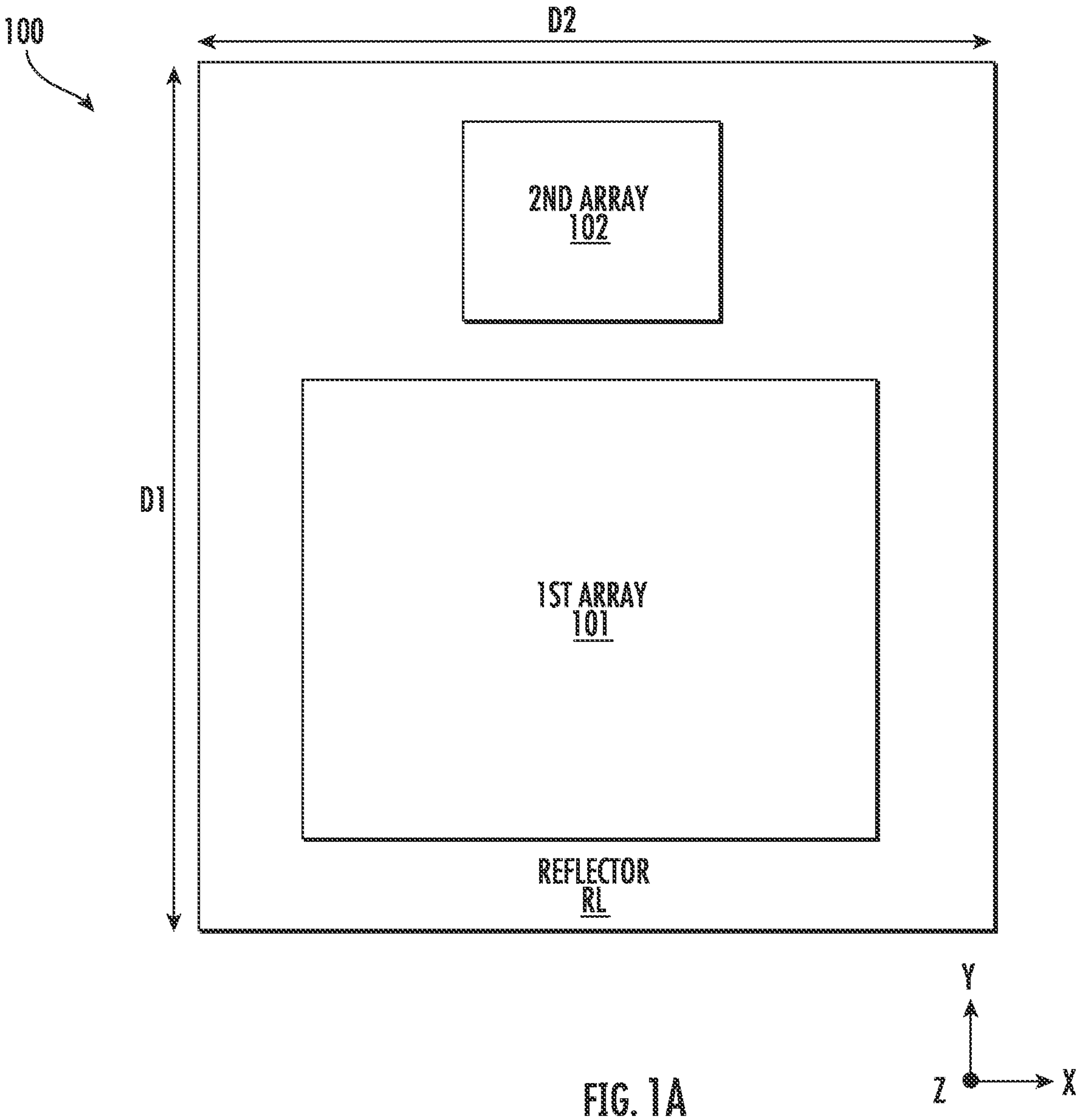
FIG. 1A is a schematic block diagram of the front of an antenna, according to embodiments of the present invention.

FIG. 1A is a schematic block diagram of the front (e.g., top) of an antenna 100, according to embodiments of the present invention. As shown in FIG. 1A, the antenna 100 includes first and second beamforming arrays 101, 102 ("antenna arrays") of radiating elements on a reflector RL. For example, the reflector RL may be a flat reflector rather than a bent/slanted reflector. Radiating elements on the reflector RL may thus all extend forward (e.g., upward) in the same direction Z.

In some embodiments, the arrays 101, 102 may each be configured to provide ground-to-air communications. Accordingly, the reflector RL may lie flat on the ground (or parallel to the ground), and the direction Z may be a vertical direction. The antenna 100 may thus be a ground-to-air antenna.

The first array 101 may comprise first-band radiating elements 171 (FIG. 1C), and the second array 102 may comprise second-band radiating elements 191 (FIG. 1D), where the first and second bands are different frequency bands. For example, the first-band radiating elements 171 may be configured to transmit and/or receive RF signals in one or more bands comprising frequencies that include 2.4 gigahertz ("GHz"), and the second-band radiating elements 191 may be configured to transmit and/or receive RF signals in one or more bands comprising frequencies that include 5.8 GHz. The first band may thus encompass lower frequencies than the second band.

A length D1 of the reflector RL in a direction Y may be about 1,200 mm, and a width D2 of the reflector RL in a direction X may be about 865 mm. For example, the length D1 may be 1,200 mm or shorter, and the width D2 may be 865 mm or shorter. According to some embodiments, the directions X and Y may be horizontal directions that are each perpendicular to the vertical direction Z. In contrast with the reflector RL, a pyramid-shaped slanted reflector may have a base with four sides that are each about 2,400 mm long. Four antenna modules that each have a first-band array and a second-band array (each of which may be configured to provide nine antenna beams per polarization) may be on four slanted faces, respectively, of the pyramid-shaped slanted reflector. The reflector RL of the antenna 100 may thus be significantly smaller than the pyramid-shaped slanted reflector.

Figure 1B:
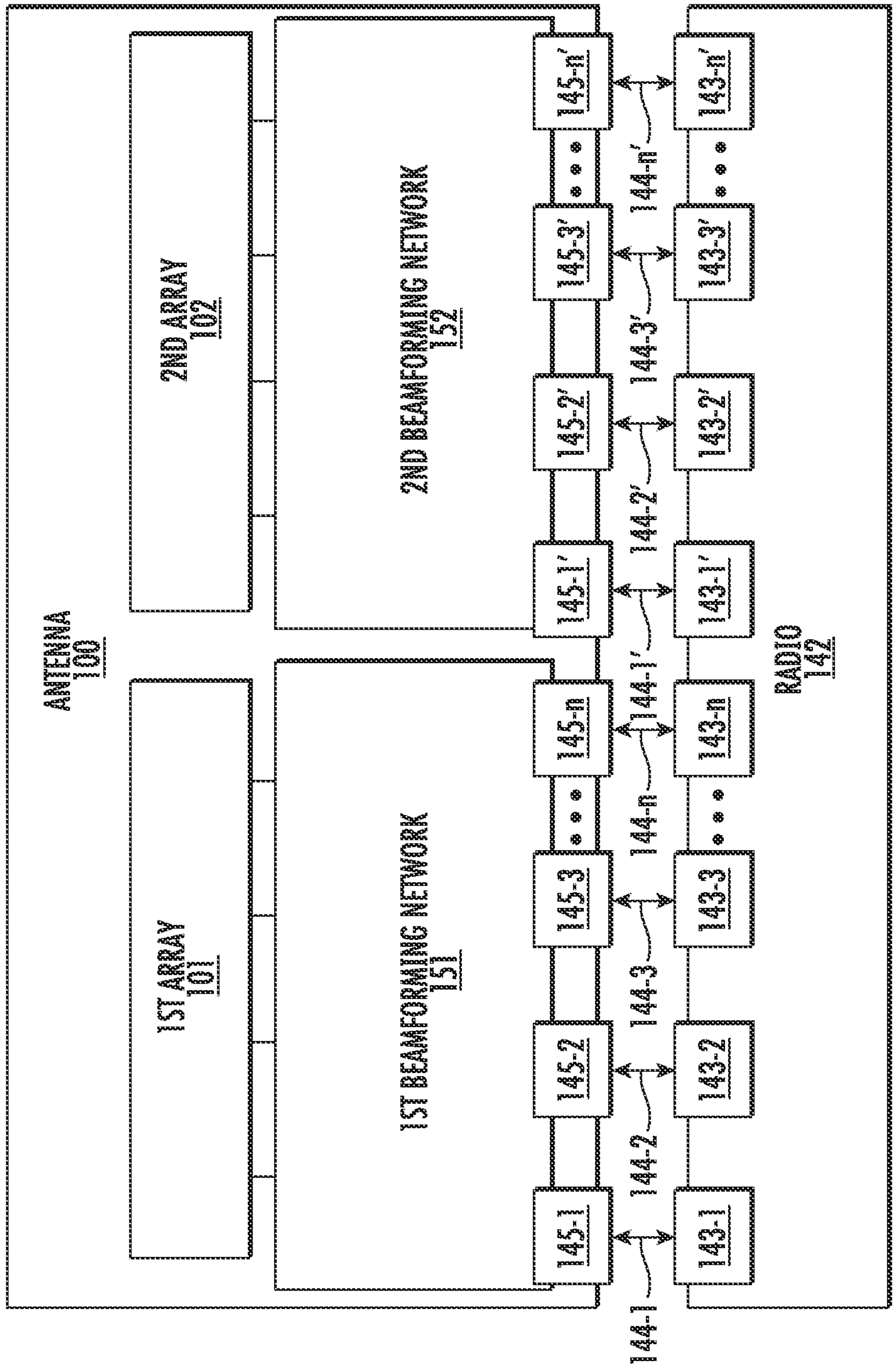
FIG. 1B is a schematic block diagram of ports of the antenna of FIG. 1A electrically connected to ports of a radio.

FIG. 1B is a schematic block diagram of RF connector ports of the antenna 100 of FIG. 1A electrically connected to RF ports of a radio 142. As shown in FIG. 1B, ports 145-1 through **145-*n* of the antenna 100 that feed the first array 101 are electrically connected to ports 143-1 through 143-*n*, respectively, of the radio 142 by respective RF transmission lines 144-1 through 144-*n*, such as coaxial cables. Moreover, ports 145-1' through 145-*n*' of the antenna 100 that feed the second array 102 are electrically connected to ports 143-1' through 143-*n*', respectively, of the radio 142 by respective RF transmission lines 144-1' through 144-*n*'**, such as coaxial cables. In some embodiments, the number n may be eight, sixteen, twenty-five, thirty-six, fifty, sixty-four, seventy-two, one hundred twenty-eight, one hundred forty-four, or more.

A first beamforming network 151 may be coupled between the first array 101 and the ports 145-1 through **145-*n* of the antenna 100. A second beamforming network 152 may be coupled between the second array 102 and the ports 145-1' through 145-*n*' of the antenna 100. Each beamforming network 151, 152 may be implemented, for example, by a plurality of Butler matrices. Moreover, in some embodiments, the arrays 101, 102 may be dual-polarized arrays, and each beamforming network 151, 152** may include a pair of beamforming networks (one for each polarization).

For simplicity of illustration, a single radio 142 is shown in FIG. 1B. According to some embodiments, however, multiple radios 142 may be coupled to the first and second arrays 101, 102. As an example, a first radio 142 may be coupled to the ports 145-1 through **145-*n* of the antenna 100, and a second radio 142 may be coupled to the ports 145-1' through 145-*n*' of the antenna 100**.

Figure 1C:
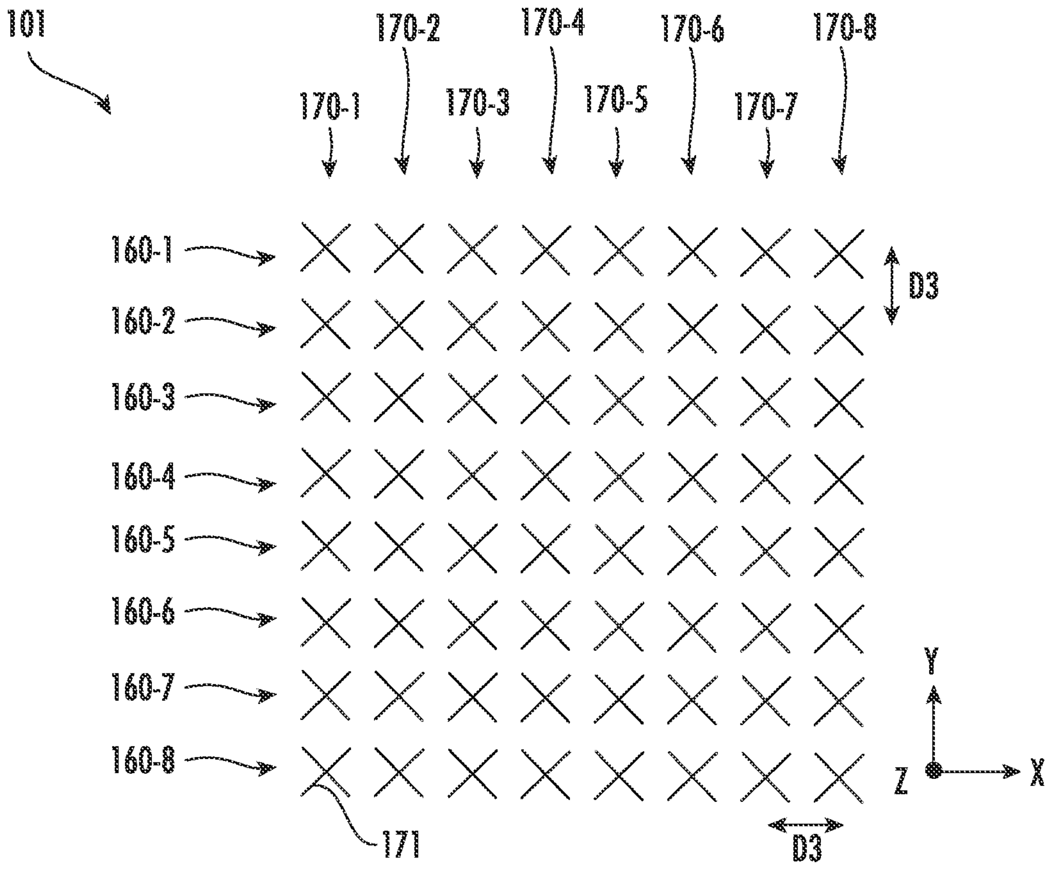
FIG. 1C is an example schematic front view of the first array of FIG. 1A.

FIG. 1C is an example schematic front view of the first array 101 of FIG. 1A. The array 101 includes eight rows 160-1 through 160-8 and eight columns 170-1 through 170-8 of radiating elements 171. The eight rows 160-1 through 160-8 are spaced apart from each other in the direction Y, and the eight columns 170-1 through 170-8 are spaced apart from each other in the direction X. Each row 160 may extend in the direction X, and each column 170 may extend in the direction Y. In some embodiments, a center-to-center distance D3 between adjacent rows 160 may be the same as that between adjacent columns 170. For example, the distance D3 may be a half-wavelength of an operating frequency band of the radiating elements 171.

Though FIG. 1C illustrates eight rows 160-1 through 160-8 and eight columns 170-1 through 170-8, the antenna 100 may include more (e.g., nine, ten, or more) or fewer (e.g., six, seven, or fewer) rows 160 and columns 170. Moreover, the number of radiating elements 171 in a row 160 or a column 170 can be any quantity from two to twenty or more. For example, the eight rows 160-1 through 160-8 and eight columns 170-1 through 170-8 shown in FIG. 1C may each have five to twenty radiating elements 171. In some embodiments, the rows 160 and/or the columns 170 may each have the same number (e.g., eight) of radiating elements 171.

Figure 1D:
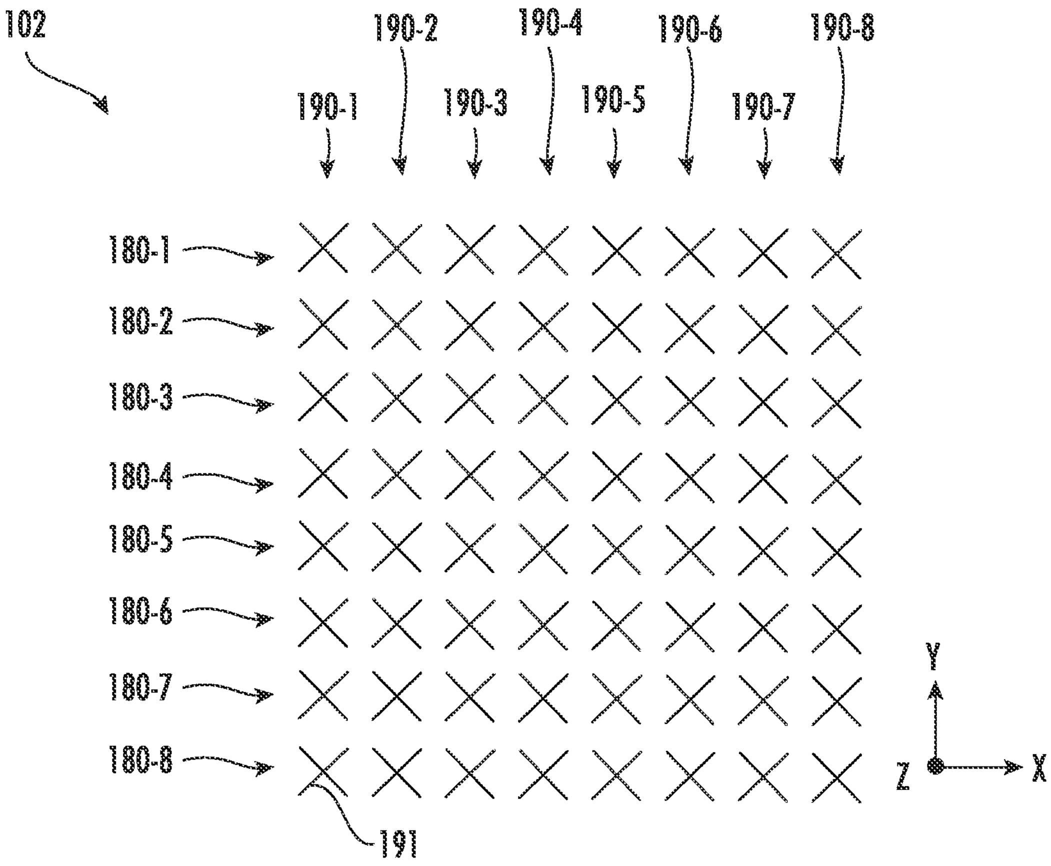
FIG. 1D is an example schematic front view of the second array of FIG. 1A.

FIG. 1D is an example schematic front view of the second array 102 of FIG. 1A. The array 102 includes eight rows 180-1 through 180-8 and eight columns 190-1 through 190-8 of radiating elements 191. Each row 180 may extend in the direction X, and each column 190 may extend in the direction Y. As with the rows 160 and columns 170 that are described herein with respect to FIG. 1C, the rows 180 and columns 190 are not limited eight radiating elements each.

In some embodiments, the first and second arrays 101, 102 may each be M×M arrays, where M is both the number of columns and the number of rows of each of the arrays 101, 102. FIGS. 1C and 1D thus show examples in which M is eight. In other examples, however, M may be larger (e.g., nine or ten) or smaller (e.g., six or seven) than eight.

Though the first and second arrays 101, 102 are shown in FIGS. 1C and 1D in non-staggered layouts, they may be implemented in staggered layouts in other embodiments (e.g., every other column 170 may be staggered by half of the distance D3 in the direction Y with respect to the remaining columns 170). For example, staggering the columns 170 that are shown in FIG. 1C may reduce mutual coupling therebetween and may improve radiation pattern performance.

Figure 1E:
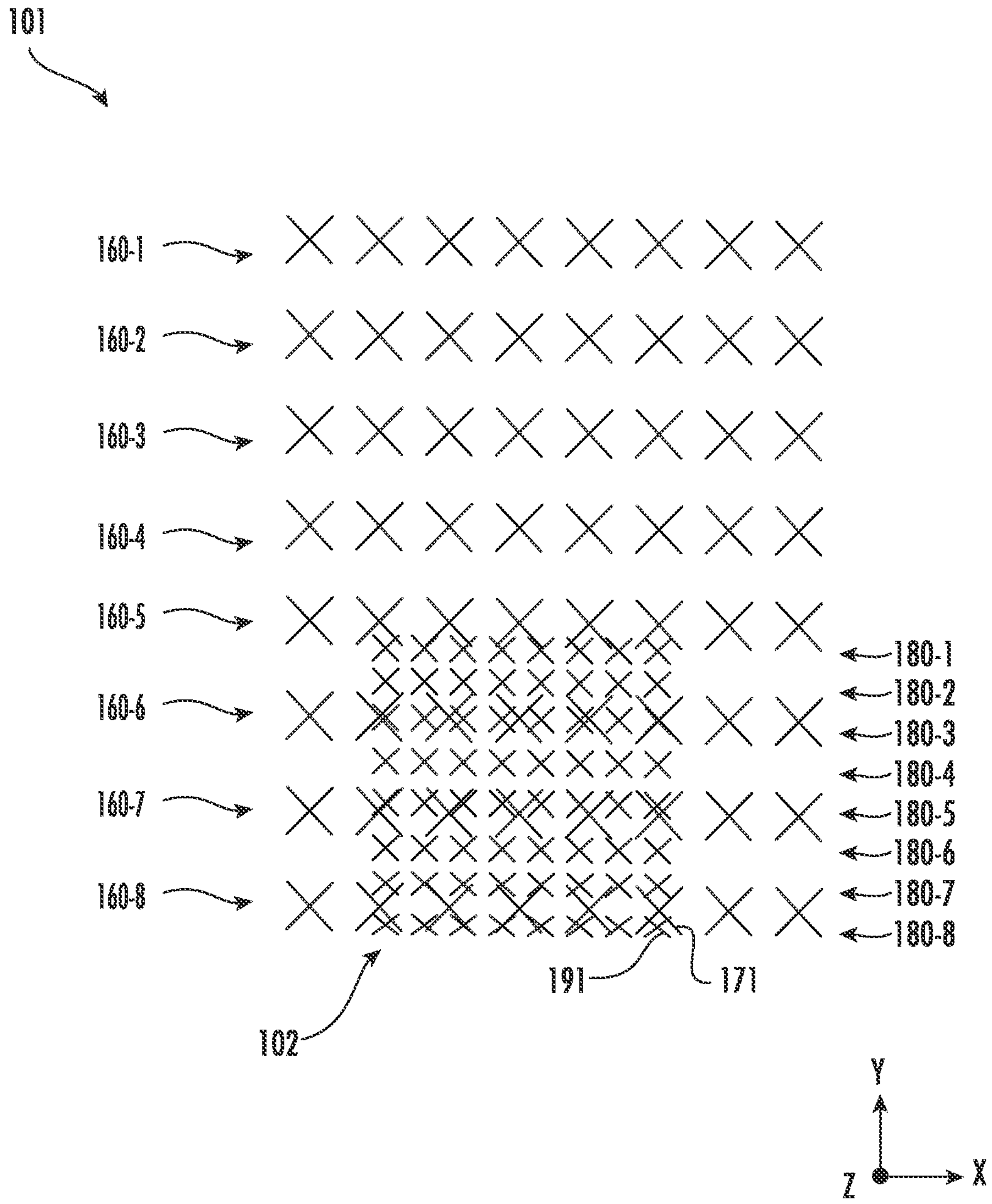
FIG. 1E is an example schematic front view of the second array of FIG. 1A interlaced with the first array of FIG. 1A.

FIG. 1E is an example schematic front view of the second array 102 of FIG. 1A interlaced with the first array 101 of FIG. 1A. As shown in FIG. 1E, one or more of the rows 180 of the second array 102 may be between, in the direction Y, adjacent rows 160 of the first array 101. For example, center points of radiating elements 191 of adjacent rows 180-6 and 180-7 may each be between center points of radiating elements 171 of adjacent rows 160-7 and 160-8. Moreover, one or more radiating elements 171 of the first array 101 may overlap, in the direction Z, one or more radiating elements 191 of the second array 102. Though FIG. 1E shows an example in which the second array 102 is interlaced with rows 160-5 through 160-8 of the first array 101, the second array 102 may be interlaced with other rows 160 (e.g., two or more of rows 160-1 through 160-4, or two or more of rows 160-3 through 160-6) of the first array 101.

By interlacing the first and second arrays 101, 102, the size of the antenna 100 can be reduced. Moreover, such interlacing may work well when an operating frequency band of the second array 102 is about twice that of the first array 101.

Figure 2A:
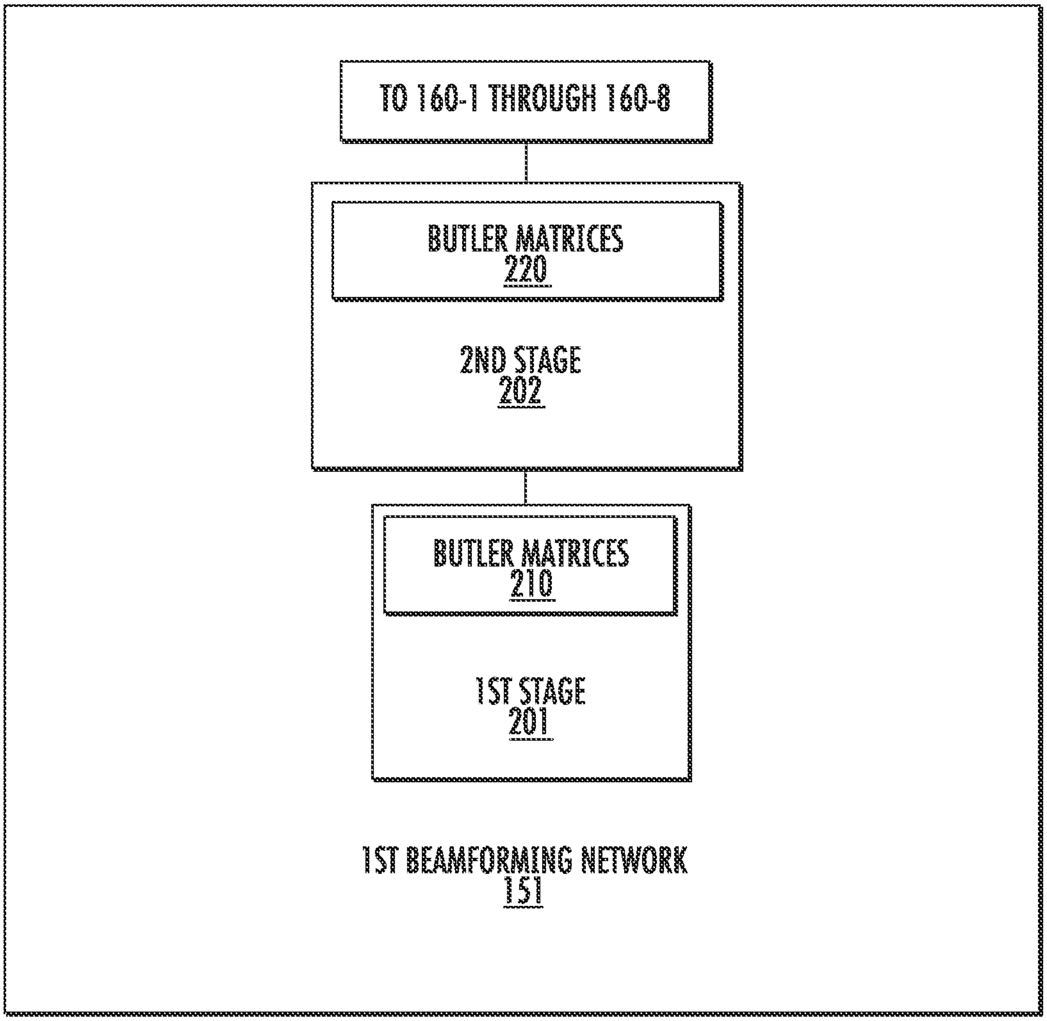
FIG. 2A is a schematic block diagram of two stages of the first beamforming network of FIG. 1B.

FIG. 2A is a schematic block diagram of first and second stages 201, 202 of the first beamforming network 151 of FIG. 1B. The first beamforming network 151 is thus a multi-stage beamforming network. The second stage 202 is coupled between the first stage 201 and the eight rows 160-1 through 160-8 (FIG. 1C) of the first array 101 (FIG. 1A). The first stage 201 may include a plurality of first Butler matrices 210, and the second stage 202 may include a plurality of second Butler matrices 220 that are coupled between the first Butler matrices 210 and the eight rows 160-1 through 160-8. For example, the eight rows 160-1 through 160-8 may be respective sub-arrays of radiating elements 171 (FIG. 1C) that are fed by eight Butler matrices 220-1 through 220-8 (FIG. 3D), respectively, of the second stage 202.

In some embodiments, the radiating elements 171 are dual-polarized (e.g., slant −/+45° crossed-dipole radiating elements) so that each row 160 includes two rows of dipole radiators. Dipole radiators that have the first polarization and are in a first of the two rows of radiators are fed by a different Butler matrix 220 from dipole radiators that have the second polarization and are in a second of the two rows of radiators. The two stages 201, 202 may thus include both first-polarization Butler matrices and second-polarization Butler matrices, where the second polarization (e.g., −45°) is different from (e.g., orthogonal to) the first polarization (+45°).

Figure 2B:
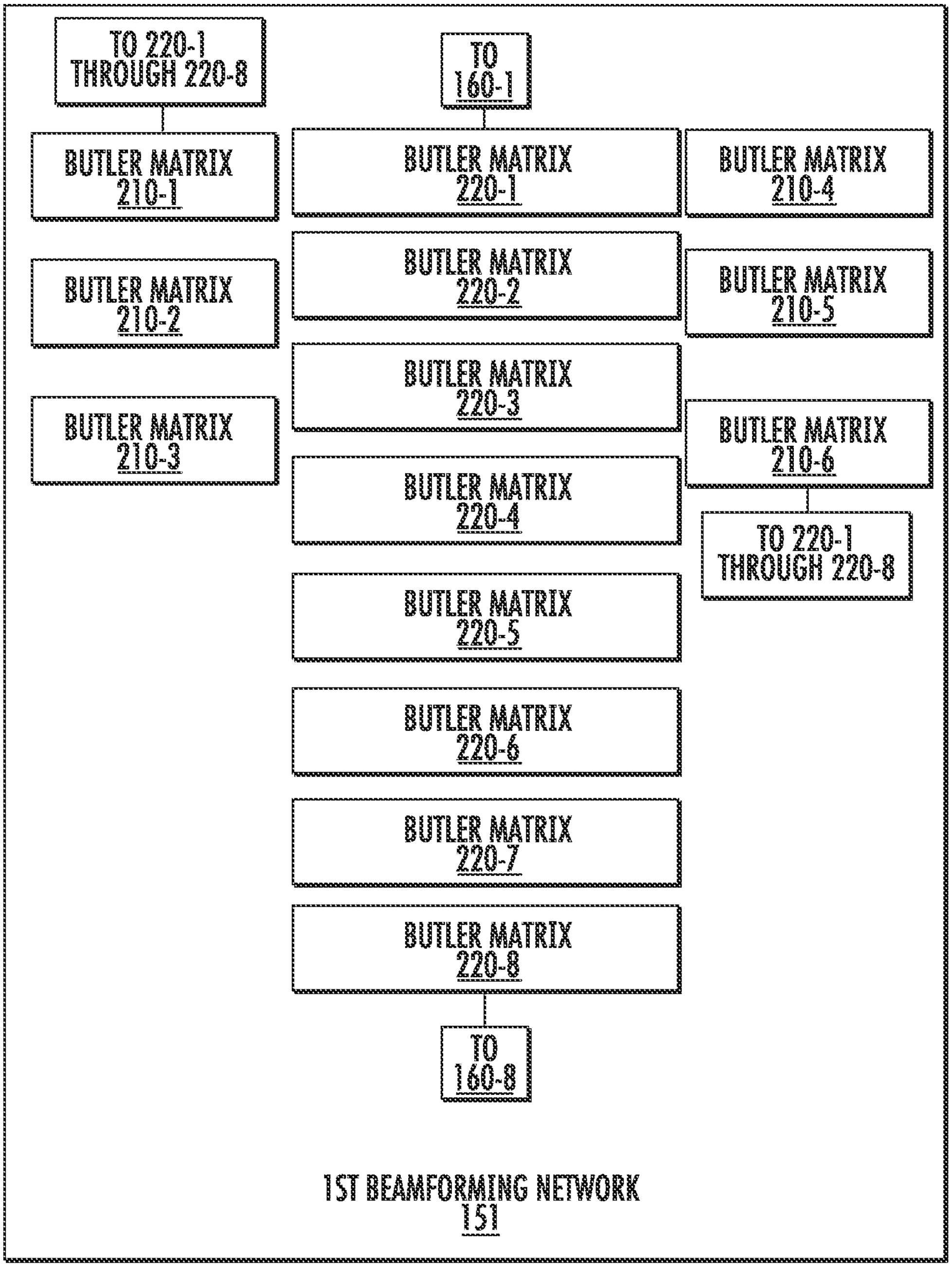
FIG. 2B is a schematic block diagram of first-polarization Butler matrices of the two stages of FIG. 2A.

FIG. 2B is a schematic block diagram of first-polarization Butler matrices of the two stages 201, 202 of FIG. 2A. The first-polarization Butler matrices include six first Butler matrices 210-1 through 210-6 and eight second Butler matrices 220-1 through 220-8. The first Butler matrices 210-1 through 210-6 are each coupled to each of the second Butler matrices 220-1 through 220-8. For simplicity of illustration, however, connections between the first Butler matrices 210-2 through 210-5 and the second Butler matrices 220-1 through 220-8 are omitted from view in FIG. 2B. Those connections are shown in FIGS. 3B and 3C. Moreover, though the second Butler matrices 220-1 through 220-8 may be coupled to the eight rows 160-1 through 160-8, respectively, of the first array 101 (FIG. 1C), connections between the second Butler matrices 220-2 through 220-7 and the rows 160-2 through 160-7, respectively, are omitted from view in FIG. 2B for simplicity of illustration. Those connections are shown in FIGS. 2G and 3D.

Figure 2C:
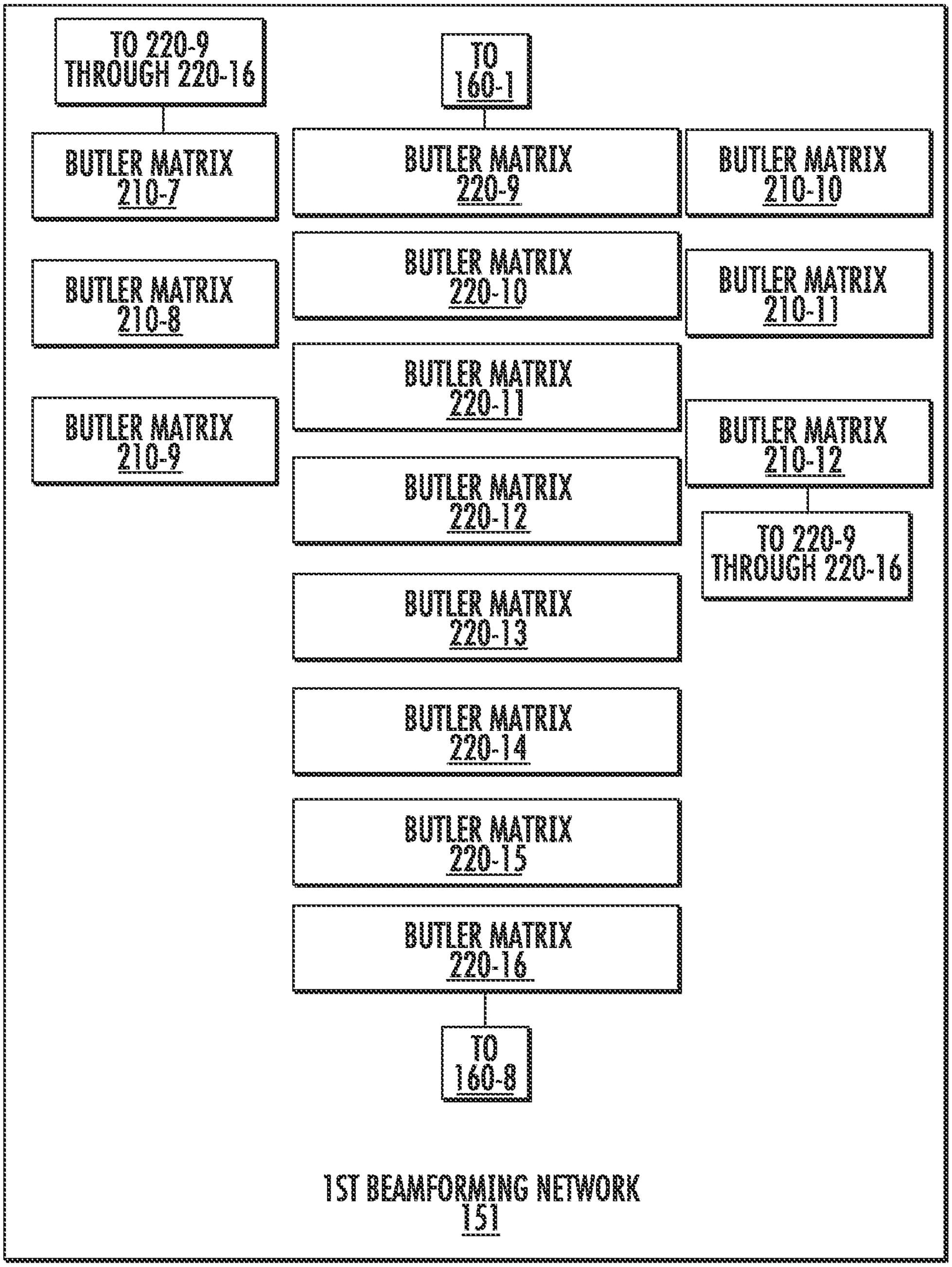
FIG. 2C is a schematic block diagram of second-polarization Butler matrices of the two stages of FIG. 2A.

FIG. 2C is a schematic block diagram of second-polarization Butler matrices of the two stages 201, 202 of FIG. 2A. The second-polarization Butler matrices include six first Butler matrices 210-7 through 210-12 and eight second Butler matrices 220-9 through 220-16. The first Butler matrices 210-7 through 210-12 are each coupled to each of the second Butler matrices 220-9 through 220-16. For simplicity of illustration, however, connections between the first Butler matrices 210-8 through 210-11 and the second Butler matrices 220-9 through 220-16 are omitted from view in FIG. 2C. Analogous connections are shown in FIGS. 3B and 3C with respect to the first polarization. Moreover, though the second Butler matrices 220-9 through 220-16 may be coupled to the eight rows 160-1 through 160-8, respectively, of the first array 101 (FIG. 1C), connections between the second Butler matrices 220-10 through 220-15 and the rows 160-2 through 160-7, respectively, are omitted from view in FIG. 2C for simplicity of illustration. Analogous connections are shown in FIGS. 2G and 3D with respect to the first polarization.

Figure 2D:
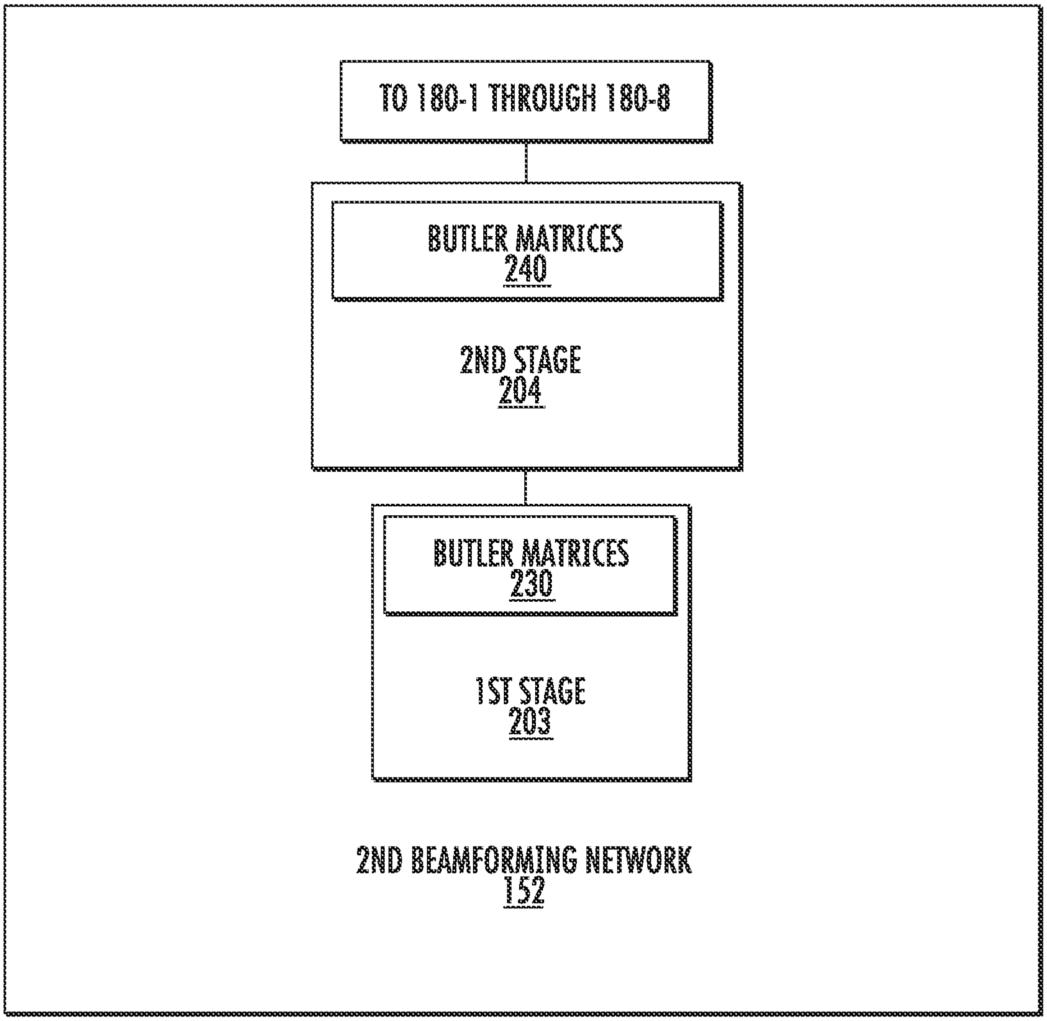
FIG. 2D is a schematic block diagram of two stages of the second beamforming network of FIG. 1B.

FIG. 2D is a schematic block diagram of first and second stages 203, 204 of the second beamforming network 152 of FIG. 1B. The second beamforming network 152, like the first beamforming network 151 (FIG. 2B), is thus a multi-stage beamforming network. The second stage 204 of the second beamforming network 152 is coupled between the first stage 203 of the second beamforming network 152 and the eight rows 180-1 through 180-8 (FIG. 1D) of the second array 102 (FIG. 1A). The first stage 203 may include a plurality of first Butler matrices 230, and the second stage 204 may include a plurality of second Butler matrices 240 that are coupled between the first Butler matrices 230 and the eight rows 180-1 through 180-8. For example, the eight rows 180-1 through 180-8 may be respective sub-arrays of radiating elements 191 (FIG. 1D) that are fed by eight Butler matrices 240-1 through 240-8 (FIG. 2E), respectively, of the second stage 204.

Figure 2E:
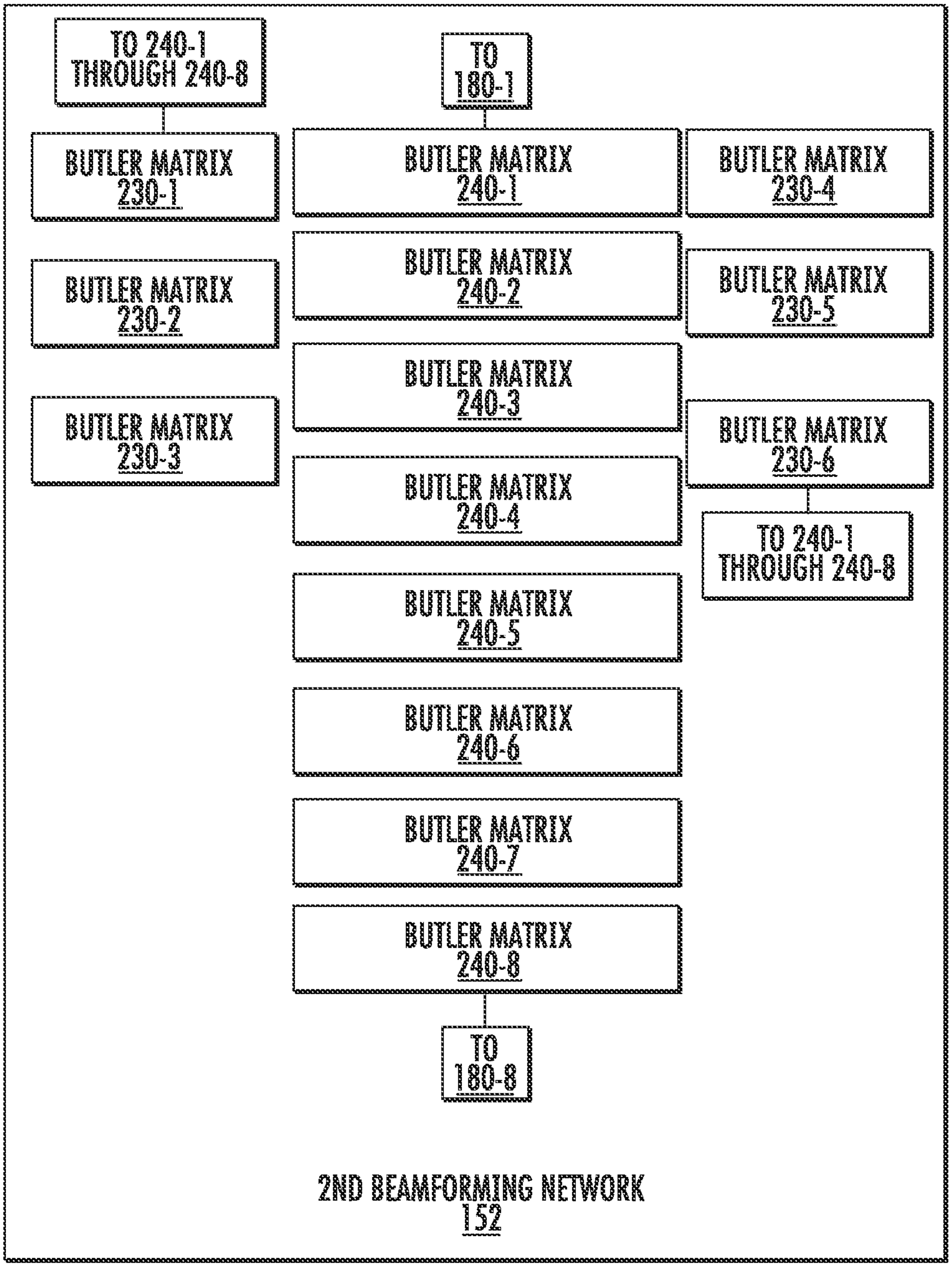
FIG. 2E is a schematic block diagram of first-polarization Butler matrices of the two stages of FIG. 2D.

FIG. 2E is a schematic block diagram of first-polarization Butler matrices of the two stages 203, 204 of FIG. 2D. The first-polarization Butler matrices include six first Butler matrices 230-1 through 230-6 and eight second Butler matrices 240-1 through 240-8. The first Butler matrices 230-1 through 230-6 are each coupled to each of the second Butler matrices 240-1 through 240-8. For simplicity of illustration, however, connections between the first Butler matrices 230-2 through 230-5 and the second Butler matrices 240-1 through 240-8 are omitted from view in FIG. 2E. Analogous connections are shown in FIGS. 3B and 3C with respect to the two stages 201, 202 of FIG. 2A. Moreover, though the second Butler matrices 240-1 through 240-8 may be coupled to the eight rows 180-1 through 180-8, respectively, of the second array 102 (FIG. 1D), connections between the second Butler matrices 240-2 through 240-7 and the rows 180-2 through 180-7, respectively, are omitted from view in FIG. 2E for simplicity of illustration. Analogous connections are shown in FIGS. 2G and 3D with respect to the Butler matrices 220 and rows 160 of FIG. 2A.

Figure 2F:
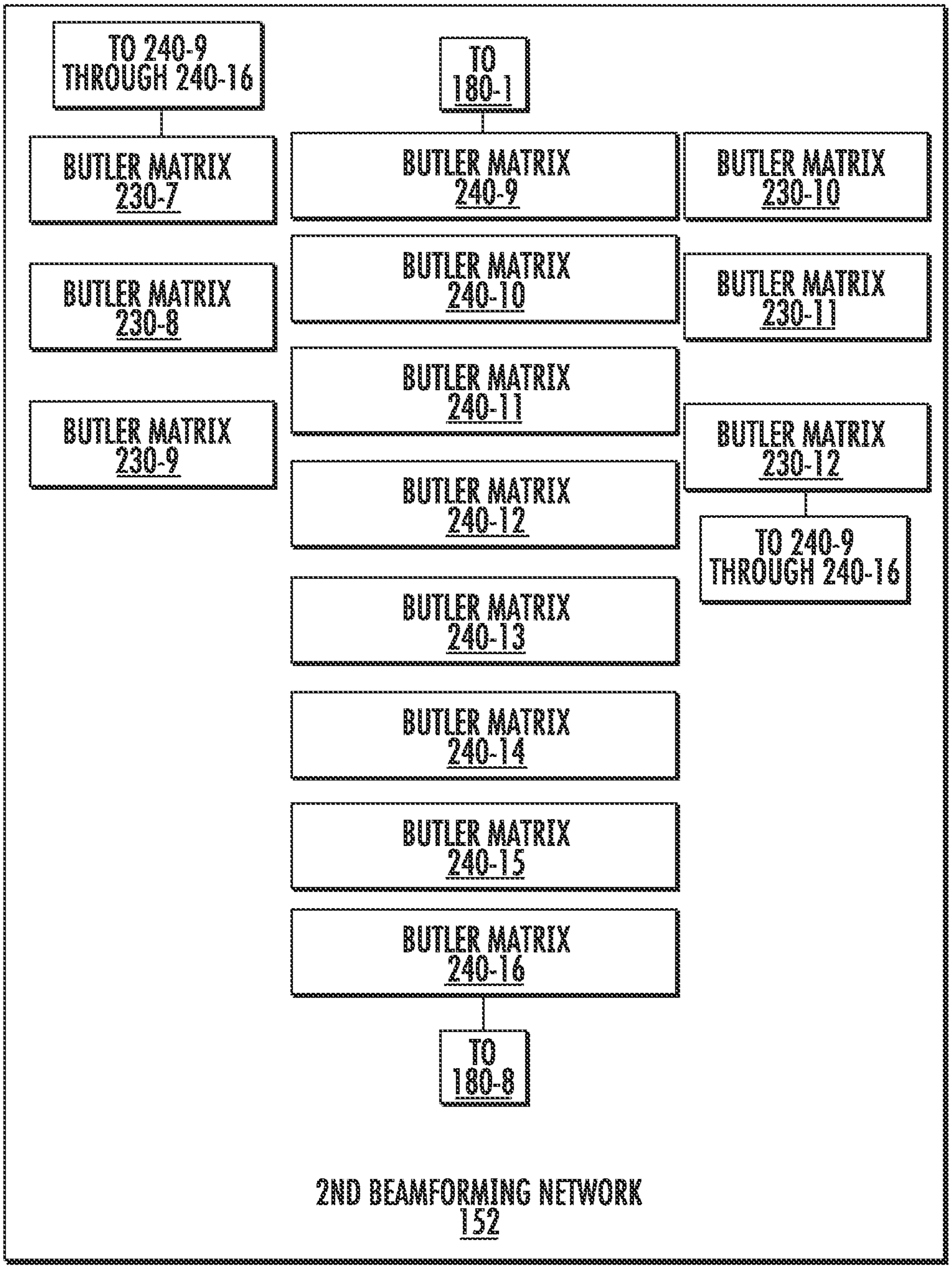
FIG. 2F is a schematic block diagram of second-polarization Butler matrices of the two stages of FIG. 2D.
Figure 2G:
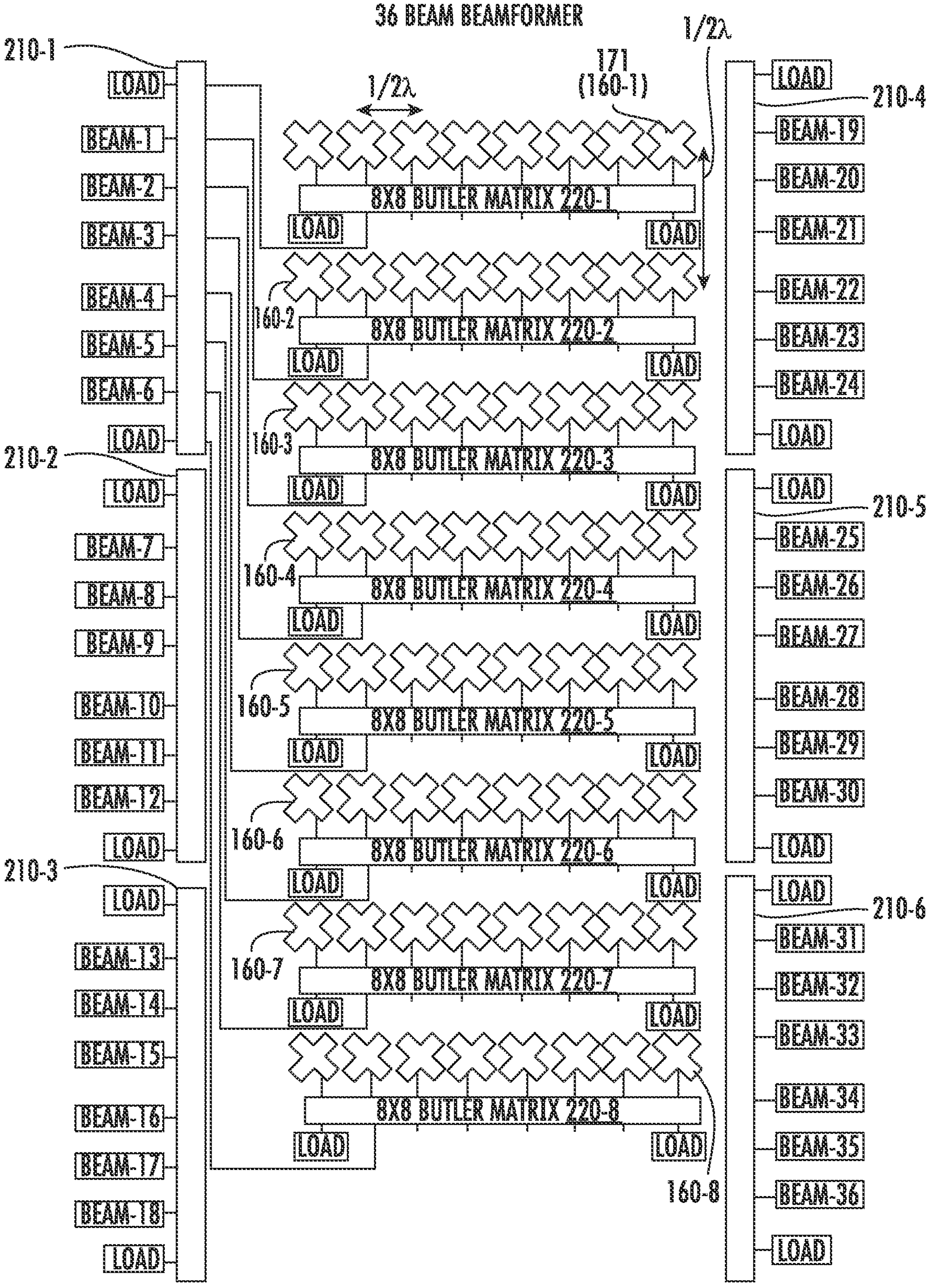
FIG. 2G is a schematic diagram of the first and second stages of FIG. 2A.

FIG. 2F is a schematic block diagram of second-polarization Butler matrices of the two stages 203, 204 of FIG. 2D. The second-polarization Butler matrices include six first Butler matrices 230-7 through 230-12 and eight second Butler matrices 240-9 through 240-16. The first Butler matrices 230-7 through 230-12 are each coupled to each of the second Butler matrices 240-9 through 240-16. For simplicity of illustration, however, connections between the first Butler matrices 230-8 through 230-11 and the second Butler matrices 240-9 through 240-16 are omitted from view in FIG. 2F. Moreover, though the second Butler matrices 240-9 through 240-16 may be coupled to the eight rows 180-1 through 180-8, respectively, of the second array 102 (FIG. 1D), connections between the second Butler matrices 240-10 through 240-15 and the rows 180-2 through 180-7, respectively, are omitted from view in FIG. 2F for simplicity of illustration.

FIG. 2G is a schematic diagram of the first and second stages 201, 202 (of the first beamforming network 151) of FIG. 2A for the first polarization (i.e., implemented with the first-polarization Butler matrices 210, 220 that are shown in FIG. 2B). The six first-polarization Butler matrices 210-1 through 210-6 of the first stage 201 may be used in conjunction with the eight first-polarization Butler matrices 220-1 through 220-8 of the second stage 202 and the eight columns 160-1 through 160-8 of radiating elements 171 to generate a total of thirty-six antenna beams (beams 1-36). Analogous connections (e.g., inputs/outputs) may be provided for the second polarization (i.e., may be implemented with respect to the second-polarization Butler matrices 210, 220 that are shown in FIG. 2C).

As shown in FIG. 2G, each Butler matrix 210 of the first stage 201 may have eight inputs. Six inputs of each Butler matrix 210 may receive RF signals from the radio 142 (FIG. 1B) that are used in conjunction with the Butler matrices 220 and the columns 160 to generate antenna beams. The two remaining inputs of each Butler matrix 210 may be coupled to a load, such as a resistive load 310 (FIG. 3A).

Each Butler matrix 220 of the second stage 202 may have eight outputs, which are coupled to radiating elements 171 of a respective column 160. Moreover, each Butler matrix 220 may have eight inputs, six of which are coupled to outputs of the six Butler matrices 210-1 through 210-6, respectively, and two of which are coupled to a load (e.g., a resistive load 310).

For simplicity of illustration, connections are shown in FIG. 2G between the first Butler matrix 210-1 and each of the eight Butler matrices 220-1 through 220-8, and are omitted from view in FIG. 2G between the second through sixth Butler matrices 210-2 through 210-6 and the eight Butler matrices 220-1 through 220-8. The connections that are omitted from view in FIG. 2G are shown in FIGS. 3B and 3C.

Figure 3A:
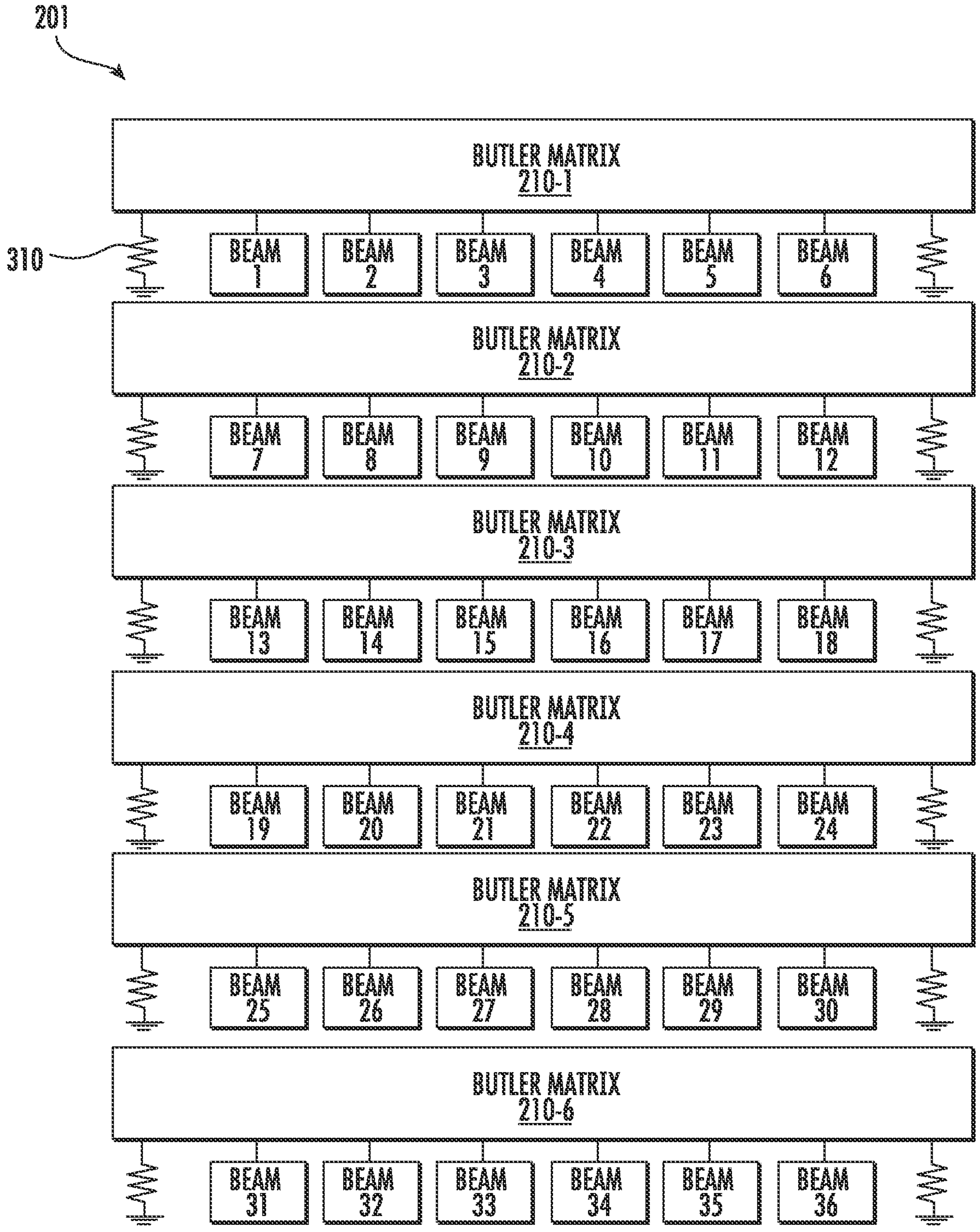
FIG. 3A is a schematic block diagram showing inputs to the first-polarization Butler matrices of the first stage of FIG. 2A.
Figure 3B:
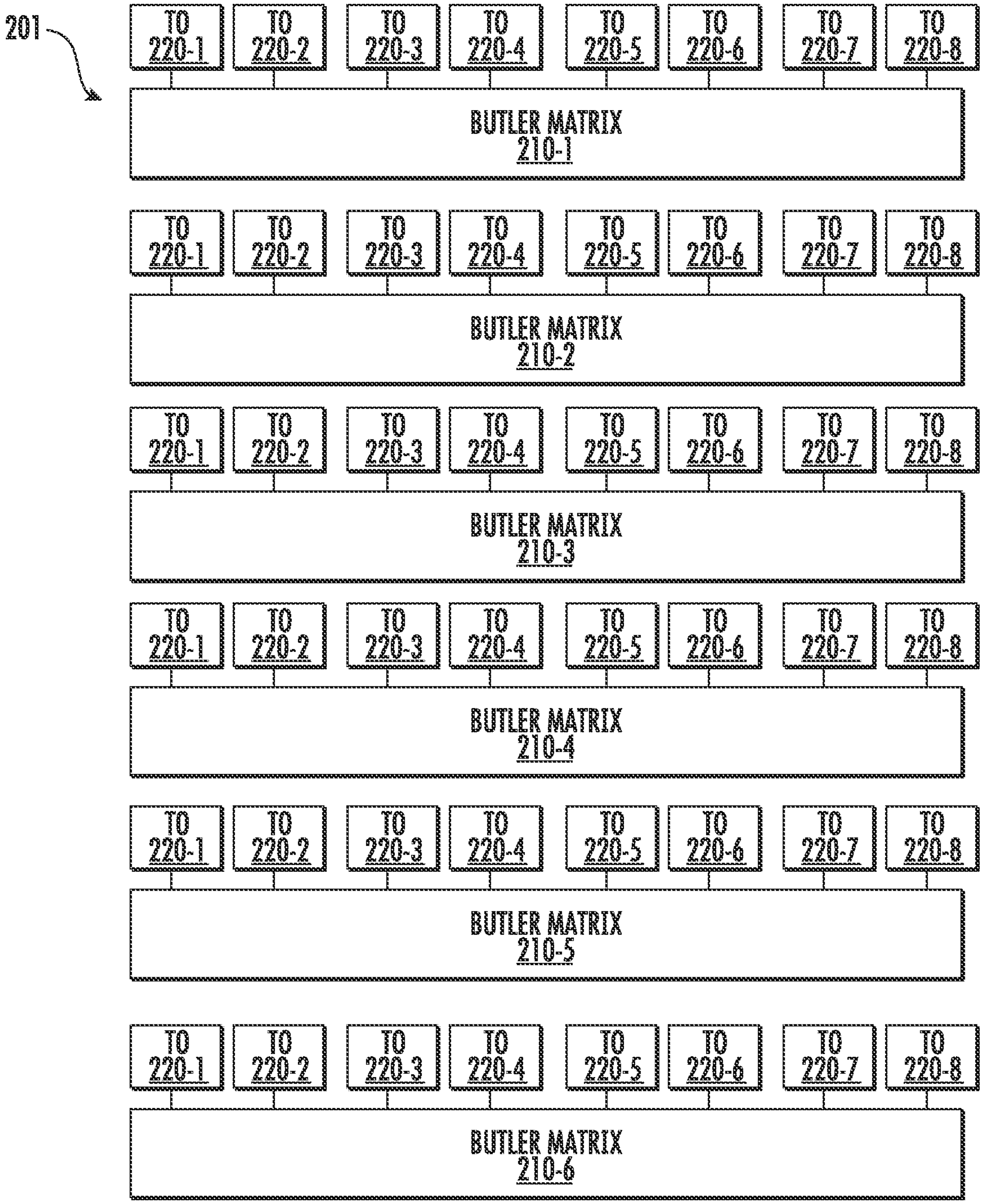
FIG. 3B is a schematic block diagram showing outputs of the first-polarization Butler matrices of the first stage of FIG. 2A.
Figure 3C:
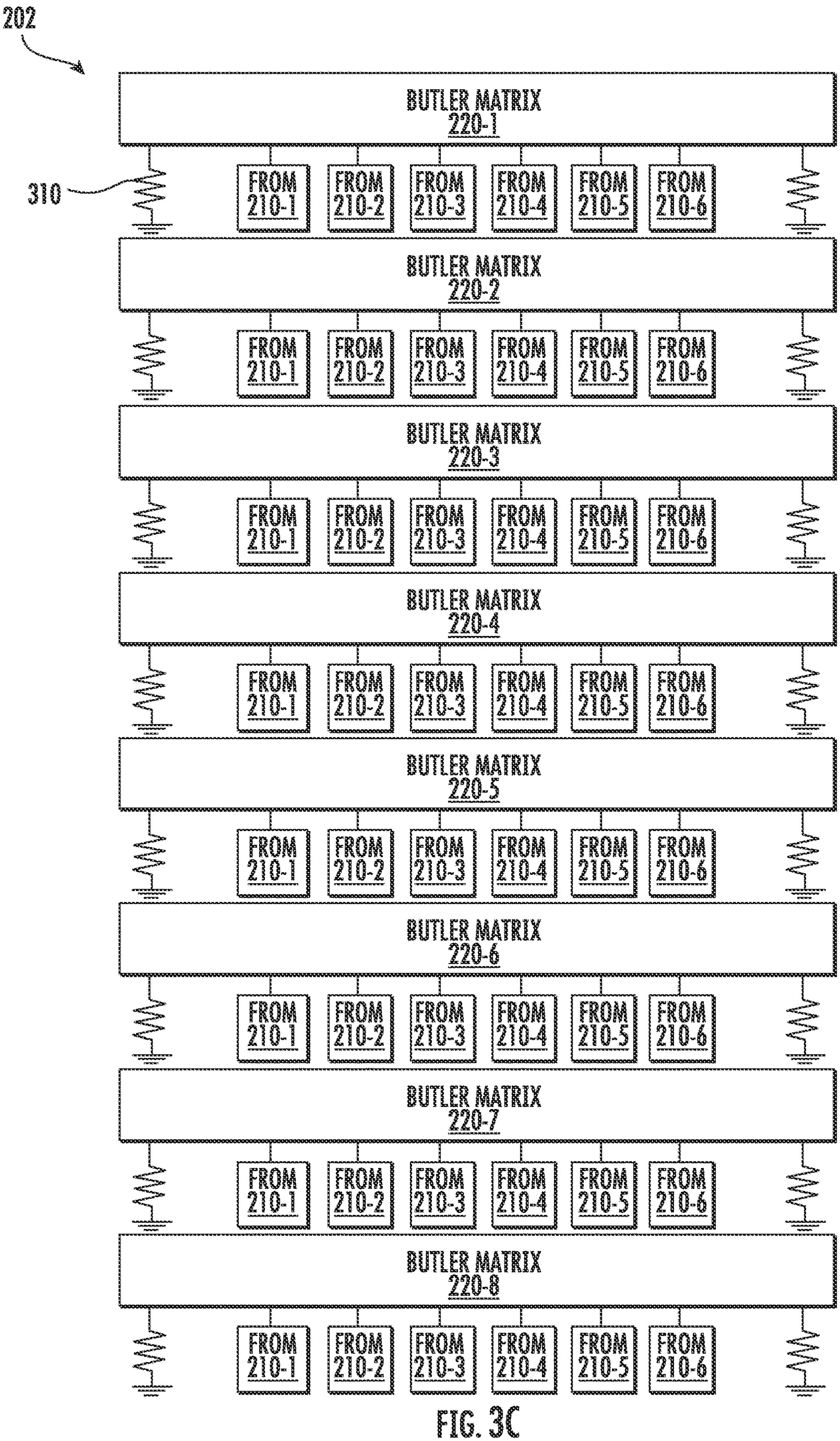
FIG. 3C is a schematic block diagram showing inputs to the first-polarization Butler matrices of the second stage of FIG. 2A.
Figure 3D:
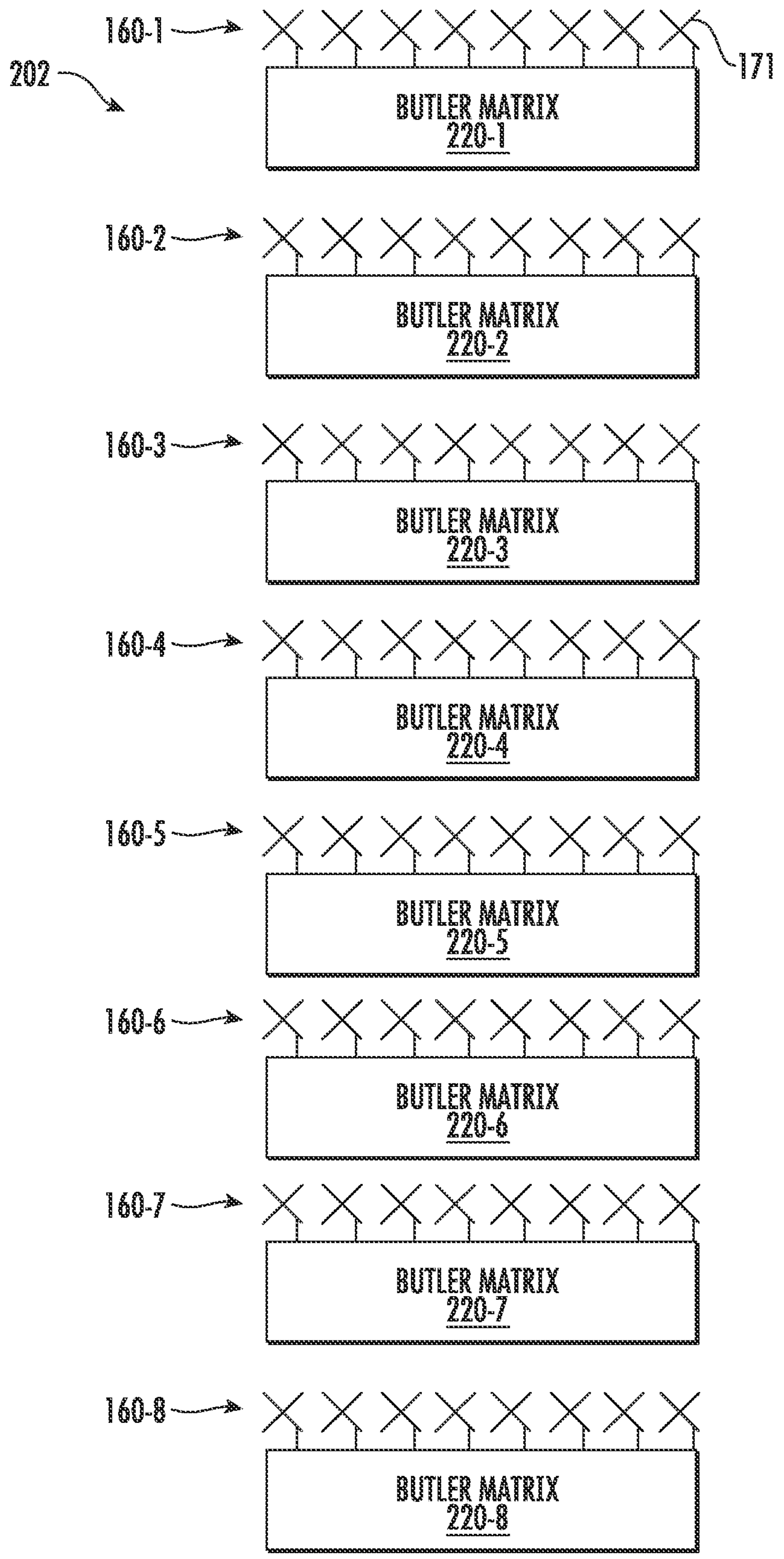
FIG. 3D is a schematic block diagram showing outputs of the first-polarization Butler matrices of the second stage of FIG. 2A.

FIGS. 3A-3D are schematic block diagrams of different portions of the schematic diagram that is shown in FIG. 2G. FIG. 3A is a schematic block diagram showing inputs to the first-polarization Butler matrices 210-1 through 210-6 of the first stage 201 of FIG. 2A. As shown in FIGS. 2G and 3A, each Butler matrix 210 may have eight inputs. In some embodiments, the two outermost inputs (i.e., the first input and the last input) of each Butler matrix 210 may be coupled to a resistive load 310, such as a 50-ohm resistor that is coupled to electrical ground. The six inner inputs of each Butler matrix 210 receive RF signals from the radio 142 (FIG. 1B) that are used in conjunction with the second stage 202 (FIG. 2A) and the first array 101 (FIG. 1A) to generate antenna beams. RF performance of the antenna 100 (FIG. 1A) may be better when the two outermost inputs of each Butler matrix 210 are coupled to the resistive load 310 rather than to RF signals from the radio 142.

FIG. 3B is a schematic block diagram showing outputs of the first-polarization Butler matrices 210-1 through 210-6 of the first stage 201 of FIG. 2A. As shown in FIGS. 2G and 3B, each Butler matrix 210 of the first stage 201 may have eight outputs that are coupled to the eight first-polarization Butler matrices 220-1 through 220-8, respectively, of the second stage 202 (FIG. 2A). Each Butler matrix 210 of the first stage 201 may thus be coupled to each Butler matrix 220 of the second stage 202.

FIG. 3C is a schematic block diagram showing inputs to the first-polarization Butler matrices 220-1 through 220-8 of the second stage 202 of FIG. 2A. As shown in FIGS. 2G and 3C, each Butler matrix 220 may have eight inputs. In some embodiments, the two outermost inputs of each Butler matrix 220 may be coupled to a resistive load 310. The six inner inputs of each Butler matrix 220 are coupled to outputs of the first-polarization Butler matrices 210-1 through 210-6, respectively, of the first stage 201 of FIG. 2A.

FIG. 3D is a schematic block diagram showing outputs of the first-polarization Butler matrices 220-1 through 220-8 of the second stage 202 of FIG. 2A. As shown in FIGS. 2G and 3D, each Butler matrix 220 of the second stage 202 may have eight outputs that are coupled to the eight radiating elements 171, respectively, of a respective row 160 of the first array 101 (FIG. 1C). Each Butler matrix 220 of the second stage 202 may thus be coupled to each radiating element 171 of a respective row 160 (and therefore may be coupled to all eight columns 170-1 through 170-8 (FIG. 1C)). The eight Butler matrices 220-1 through 220-8 are thereby coupled to the eight rows 160-1 through 160-8, respectively.

Accordingly, FIGS. 3A-3D show that the first-polarization Butler matrices 210, 220 of the first beamforming network 151 (FIG. 1B) may each be L×L Butler matrices, where L is both the number of inputs and the number of outputs. In some embodiments, L may be equal to M (the number of columns and rows of each of the arrays 101, 102 (FIG. 1A)). For simplicity of illustration, inputs and outputs of the second-polarization Butler matrices 210-7 through 210-12 and 220-9 through 220-16 (FIG. 2C) of the first beamforming network 151 are omitted from view in FIGS. 3A-3D. The inputs and outputs of the second-polarization Butler matrices 210-7 through 210-12 and 220-9 through 220-16 (which may also be L×L Butler matrices), however, may be analogous to those shown in FIGS. 3A-3D with respect to the first-polarization Butler matrices 210-1 through 210-6 and 220-1 through 220-8. Moreover, inputs and outputs of the Butler matrices 230, 240 (which may also be L×L Butler matrices) of the second beamforming network 152 shown in FIG. 2D may be analogous to those of the Butler matrices 210, 220 of the first beamforming network 151.

The first beamforming network 151, in conjunction with the first array 101, may provide thirty-six antenna beams (per polarization) that provide coverage to a generally square area. The thirty-six antenna beams may have consistent directivity/gain with small/minimal variation in the X-Z plane (FIG. 1A) and/or the Y-Z plane (FIG. 1A). Crossover between the antenna beams may consistently be about −3.8 decibels ("dB"). Moreover, the antenna beams may consistently provide 3 dB coverage at about 800 in the X-Z plane and/or the Y-Z plane. The X-Z plane may include six of the thirty-six antenna beams. Likewise, the Y-Z plane may include six of the thirty-six antenna beams. The X-Z and Y-Z planes may both be referred to herein as "vertical" planes, as the reflector RL (FIG. 1A) may be flat on the ground. The X-Z and Y-Z planes may thus be perpendicular to a front surface 601 (FIG. 6A) of the reflector RL (and therefore perpendicular to the ground/horizon).

Figure 4A:
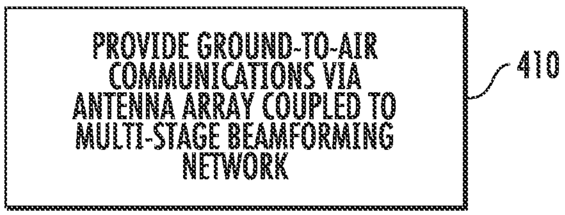
FIGS. 4A and 4B are flowcharts illustrating operations of the antenna shown in FIG. 1B.
Figure 4B:
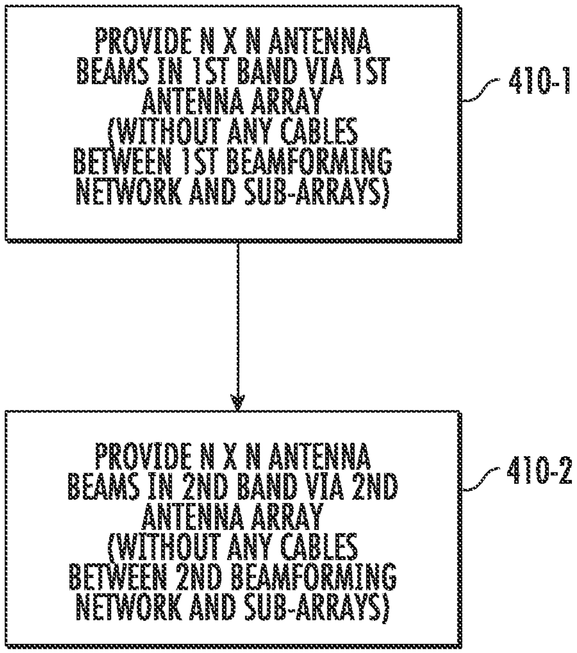

FIGS. 4A and 4B are flowcharts illustrating operations of the antenna 100 shown in FIG. 1B. As shown in FIG. 4A, the operations may include providing (Block 410) ground-to-air communications via the first array 101 (FIG. 1A) of the antenna 100 that is coupled to the first beamforming network 151 (FIG. 1B) having the first and second stages 201, 202 (FIG. 2A). In some embodiments, the antenna 100 may comprise a flat reflector RL (FIG. 1A) such that radiating elements 171 (FIG. 1C) of the first array 101 extend upward in the direction Z (FIG. 1A) from the reflector RL toward the sky (i.e., perpendicular to the ground/horizon). Moreover, the first array 101 may comprise a plurality of sub-arrays (e.g., rows 160 (FIG. 1C)) of radiating elements 171 on the reflector RL.

As shown in FIG. 4B, the antenna 100 may be a multi-band ground-to-air antenna, and operations of providing (Block 410 of FIG. 4A) ground-to-air communications may include providing (Block 410-1) N×N antenna beams in a first frequency band (e.g., a band including 2.4 GHz) via the first array 101, without any cables coupled between the first beamforming network 151 and the sub-arrays of the first array 101. Moreover, the operations of providing (Block 410 of FIG. 4A) the ground-to-air communications may include providing (Block 410-2) N×N antenna beams in a second frequency band (e.g., a band including 5.8 GHz) via the second array 102 (FIG. 1A), without any cables coupled between the second beamforming network 152 (FIG. 1B) and sub-arrays (e.g., rows 180 (FIG. 1D)) of the second array 102.

For example, N×N may be thirty-six, and the first and second arrays 101, 102 may both be dual-polarized arrays. Accordingly, the first and second arrays 101, 102 may each provide an equal number of (thirty-six) antenna beams per polarization. In other examples, N×N may be twenty-five or sixty-four, and the first and second arrays 101, 102 may each provide twenty-five or sixty-four antenna beams per polarization.

The absence of cables between the beamforming networks 151, 152 and the sub-arrays of the first and second arrays 101, 102 may reduce the size (i.e., dimensions) and weight of the antenna 100. Moreover, though Blocks 410-1 and 410-2 are illustrated sequentially in FIG. 4B, the operation(s) thereof may, in some embodiments, be performed concurrently.

Figure 5A:
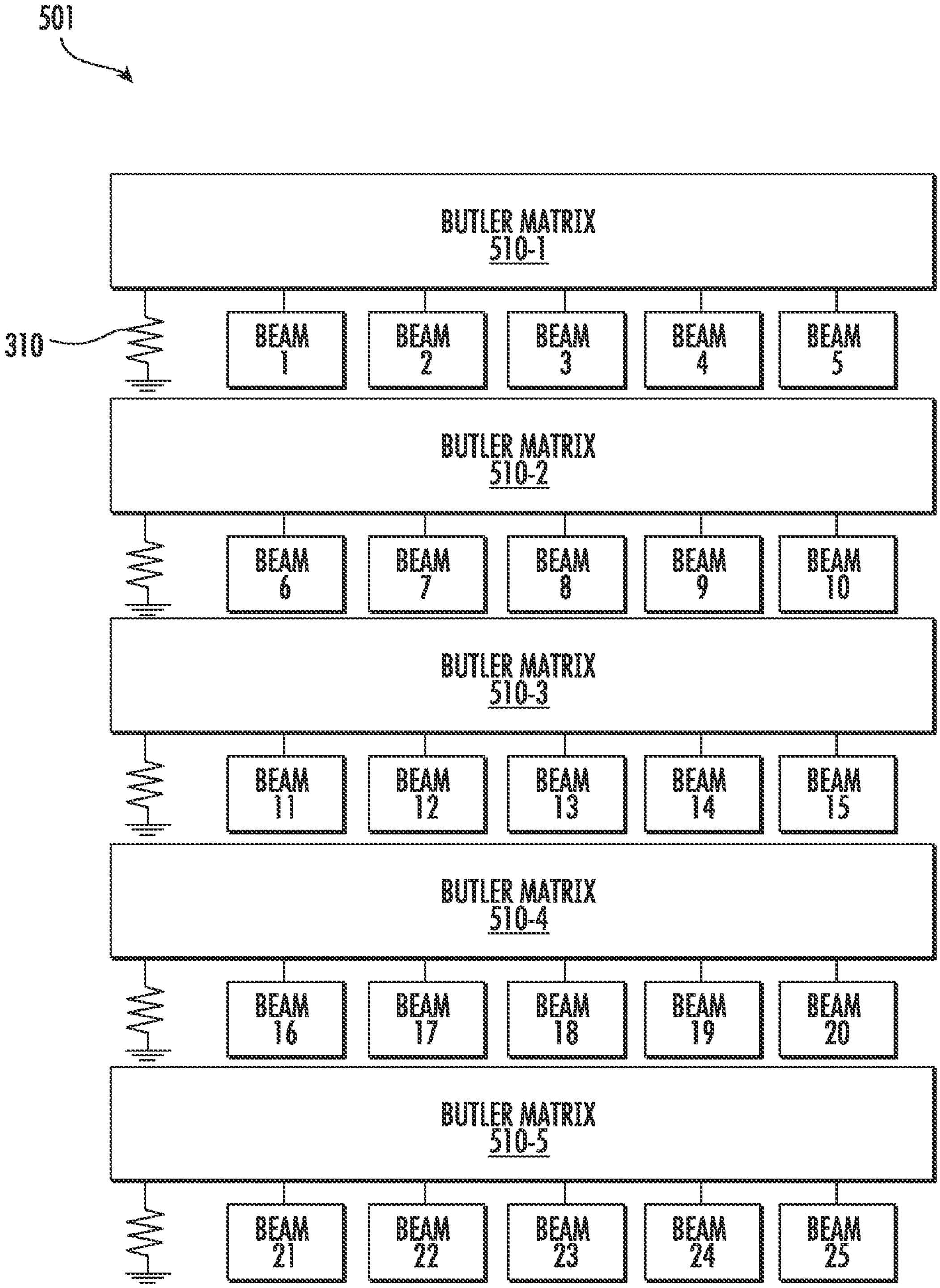
FIG. 5A is a schematic block diagram showing inputs to the first-polarization Butler matrices of the first stage of a 25-beam beamforming network.

FIG. 5A is a schematic block diagram showing inputs to first-polarization Butler matrices 510-1 through 510-5 of a first stage 501 of a beamforming network for which N×N is twenty-five. As shown in FIG. 5A, each Butler matrix 510 may have six inputs. In some embodiments, a single outermost (i.e., the first or the last) input of each Butler matrix 510 may be coupled to a resistive load 310. The five remaining inputs of each Butler matrix 510 receive RF signals from the radio 142 (FIG. 1B) that are used in conjunction with a second stage 502 (FIG. 5C) and an antenna array of radiating elements 171 (FIG. 5D) to generate twenty-five antenna beams (beams 1-25) for the first polarization.

Figure 5B:
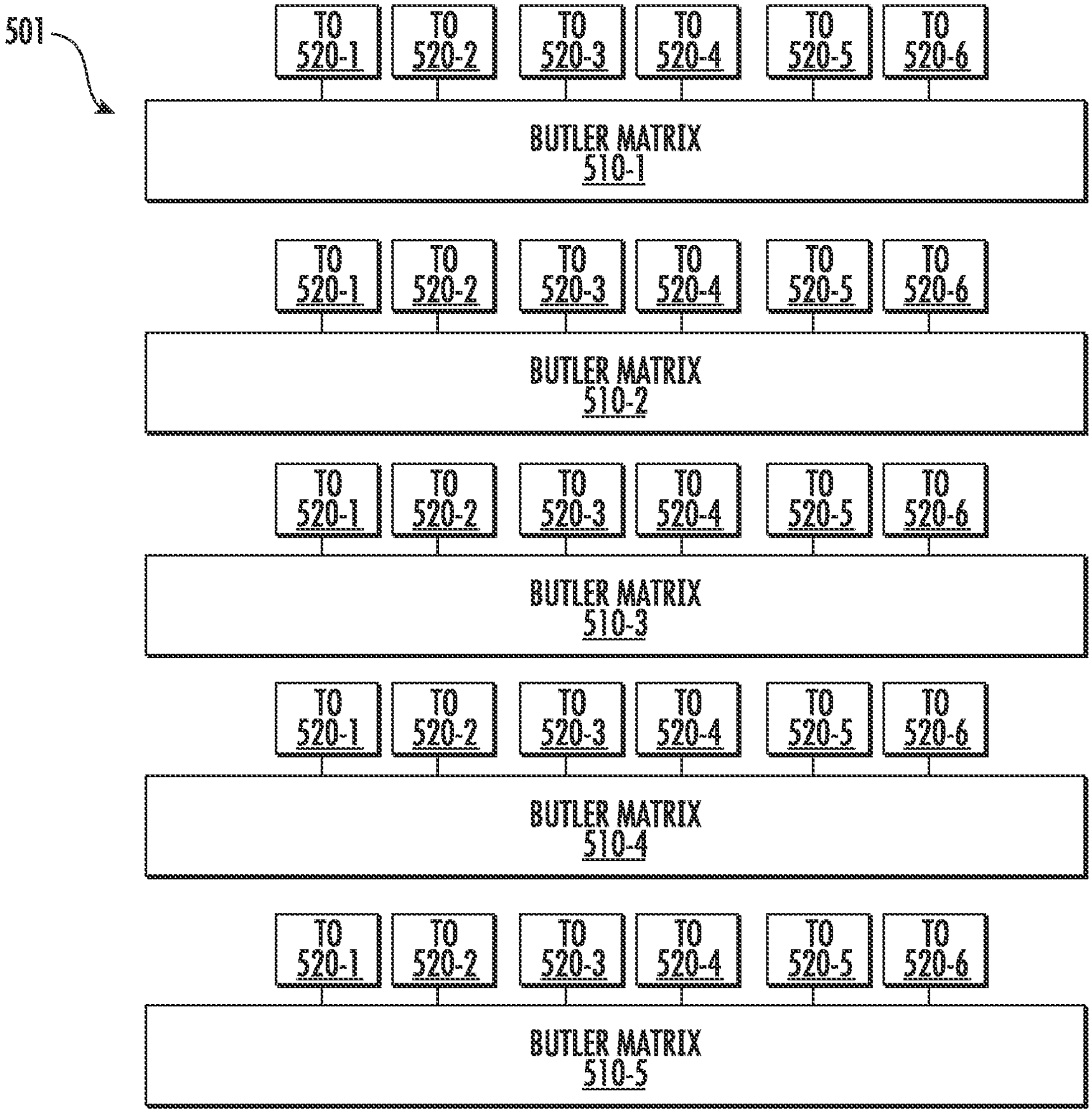
FIG. 5B is a schematic block diagram showing outputs of the first-polarization Butler matrices of the first stage of FIG. 5A.
Figure 5C:
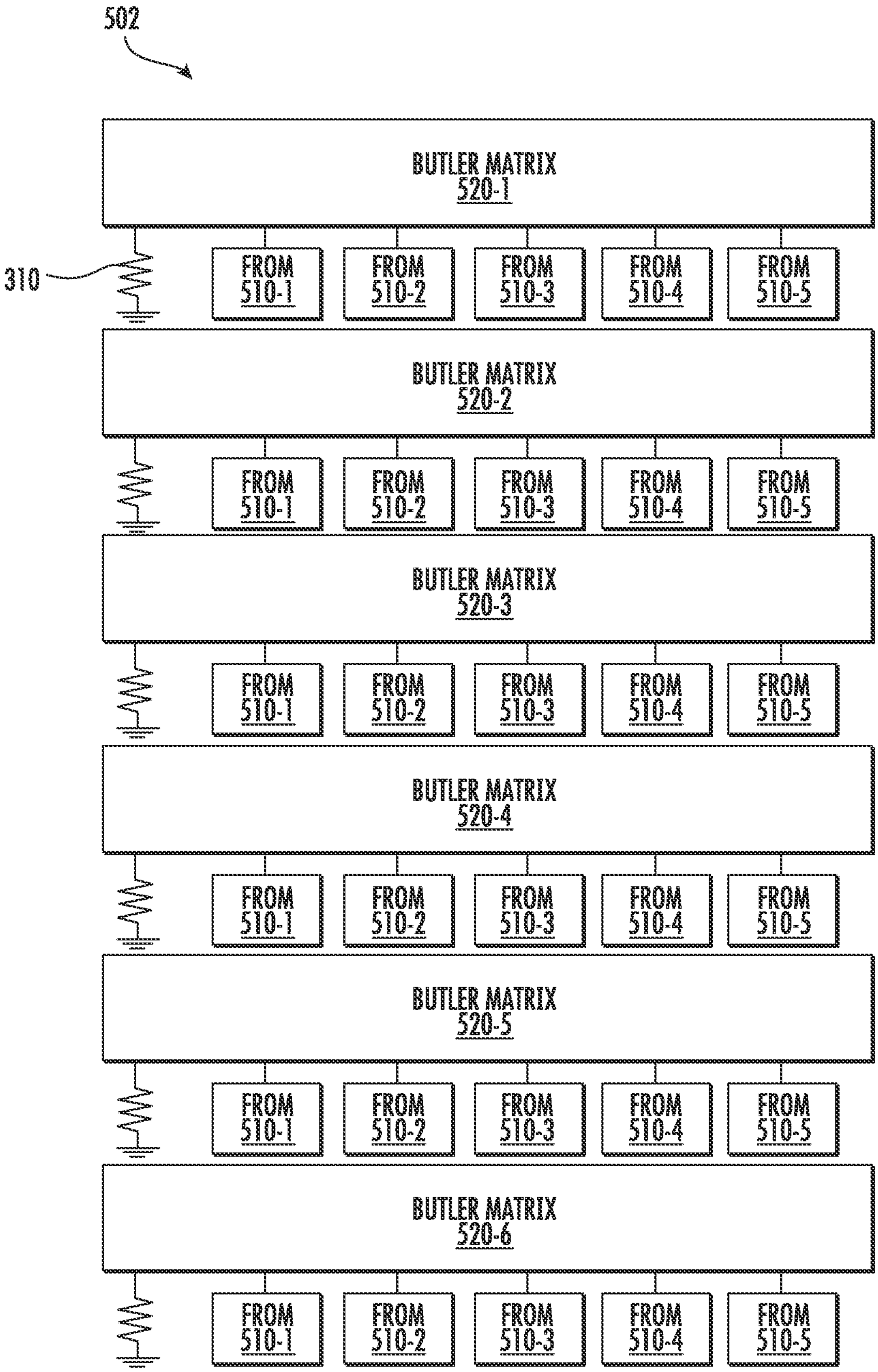
FIG. 5C is a schematic block diagram showing inputs to the first-polarization Butler matrices of the second stage of the 25-beam beamforming network.

FIG. 5B is a schematic block diagram showing outputs of the first-polarization Butler matrices 510-1 through 510-5 of the first stage 501 of FIG. 5A. As shown in FIG. 5B, each Butler matrix 510 of the first stage 501 may have six outputs that are coupled to six first-polarization Butler matrices 520-1 through 520-6, respectively, of the second stage 502 (FIG. 5C). Each Butler matrix 510 of the first stage 501 may thus be coupled to each Butler matrix 520 of the second stage 502.

FIG. 5C is a schematic block diagram showing inputs to the first-polarization Butler matrices 520-1 through 520-6 of the second stage 502 of the 25-beam beamforming network. As shown in FIG. 5C, each Butler matrix 520 may have six inputs. In some embodiments, a single outermost (i.e., the first or the last) input of each Butler matrix 520 may be coupled to a resistive load 310. The remaining five inputs of each Butler matrix 520 are coupled to outputs of the first-polarization Butler matrices 510-1 through 510-5, respectively, of the first stage 501 of FIG. 5A.

Figure 5D:
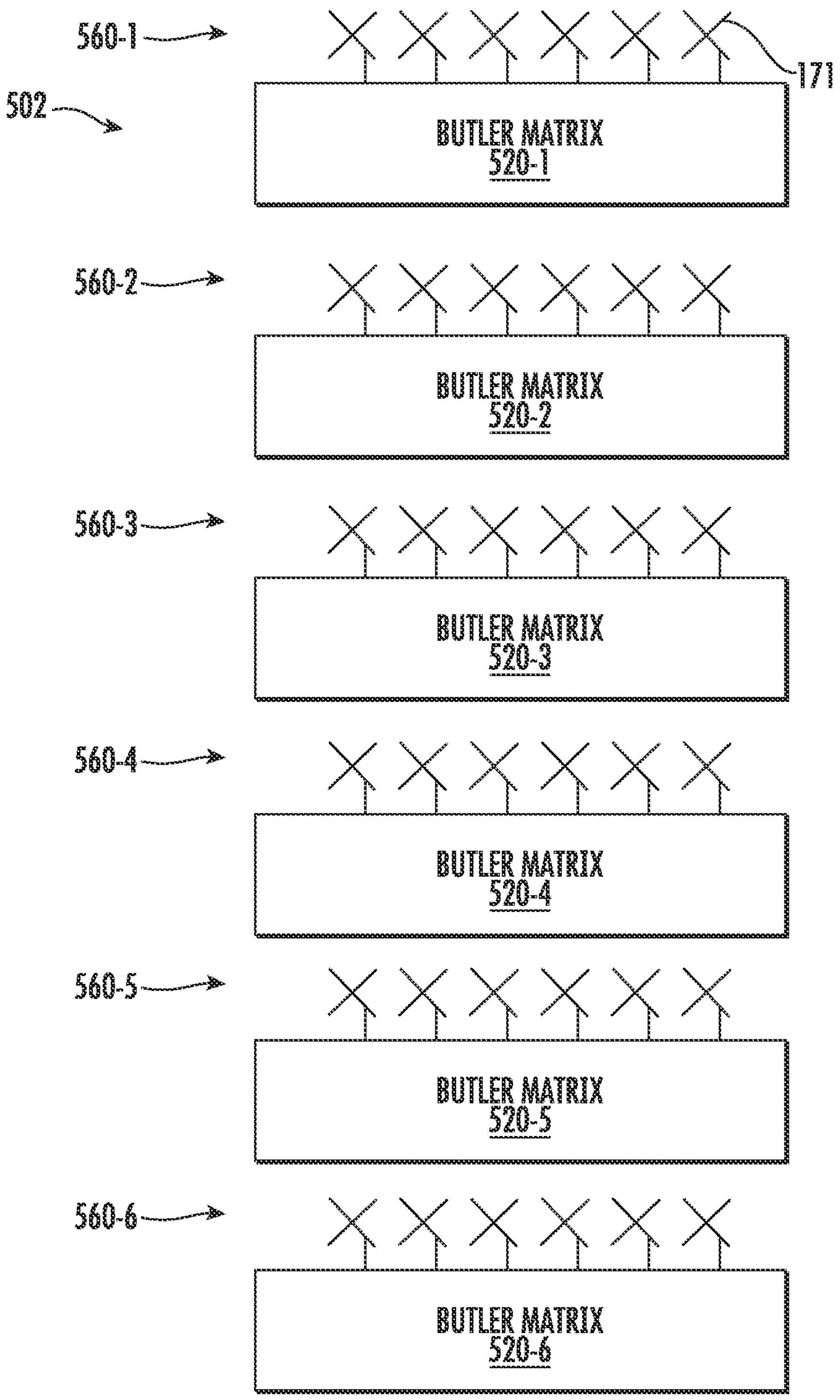
FIG. 5D is a schematic block diagram showing outputs of the first-polarization Butler matrices of the second stage of FIG. 5C.

FIG. 5D is a schematic block diagram showing outputs of the first-polarization Butler matrices 520-1 through 520-6 of the second stage 502 of FIG. 5C. As shown in FIG. 5D, each Butler matrix 520 of the second stage 502 may have six outputs that are coupled to six radiating elements 171, respectively, of a respective row 560 of the antenna array. Each Butler matrix 520 of the second stage 502 may thus be coupled to each radiating element 171 of a respective row 560. The six Butler matrices 520-1 through 520-6 are thereby coupled to six rows 560-1 through 560-6, respectively.

Accordingly, for embodiments in which twenty-five antenna beams per polarization are desired, the beamforming network shown in FIGS. 5A-5D may be used instead of the first beamforming network 151 (FIG. 1B) whose inputs and outputs are shown in FIGS. 3A-3D. For simplicity of illustration, inputs and outputs of second-polarization Butler matrices of the beamforming network that includes the first-polarization Butler matrices 510, 520 are omitted from view in FIGS. 5A-5D. The inputs and outputs of such second-polarization Butler matrices, however, may be analogous to those shown in FIGS. 5A-5D with respect to the first-polarization Butler matrices 510, 520. Moreover, the beamforming network that includes the first-polarization Butler matrices 510, 520 may be a first-band beamforming network, and may share a reflector RL (FIG. 1A) with a second-band beamforming network that includes Butler matrices having inputs and outputs that may be analogous to those shown in FIGS. 5A-5D with respect to the Butler matrices 510, 520.

In other embodiments, a beamforming network for which N×N is sixty-four may be used. For example, such a beamforming network may use more Butler matrices than the first beamforming network 151 that is shown in FIGS. 3A-3D.

Figure 6A:
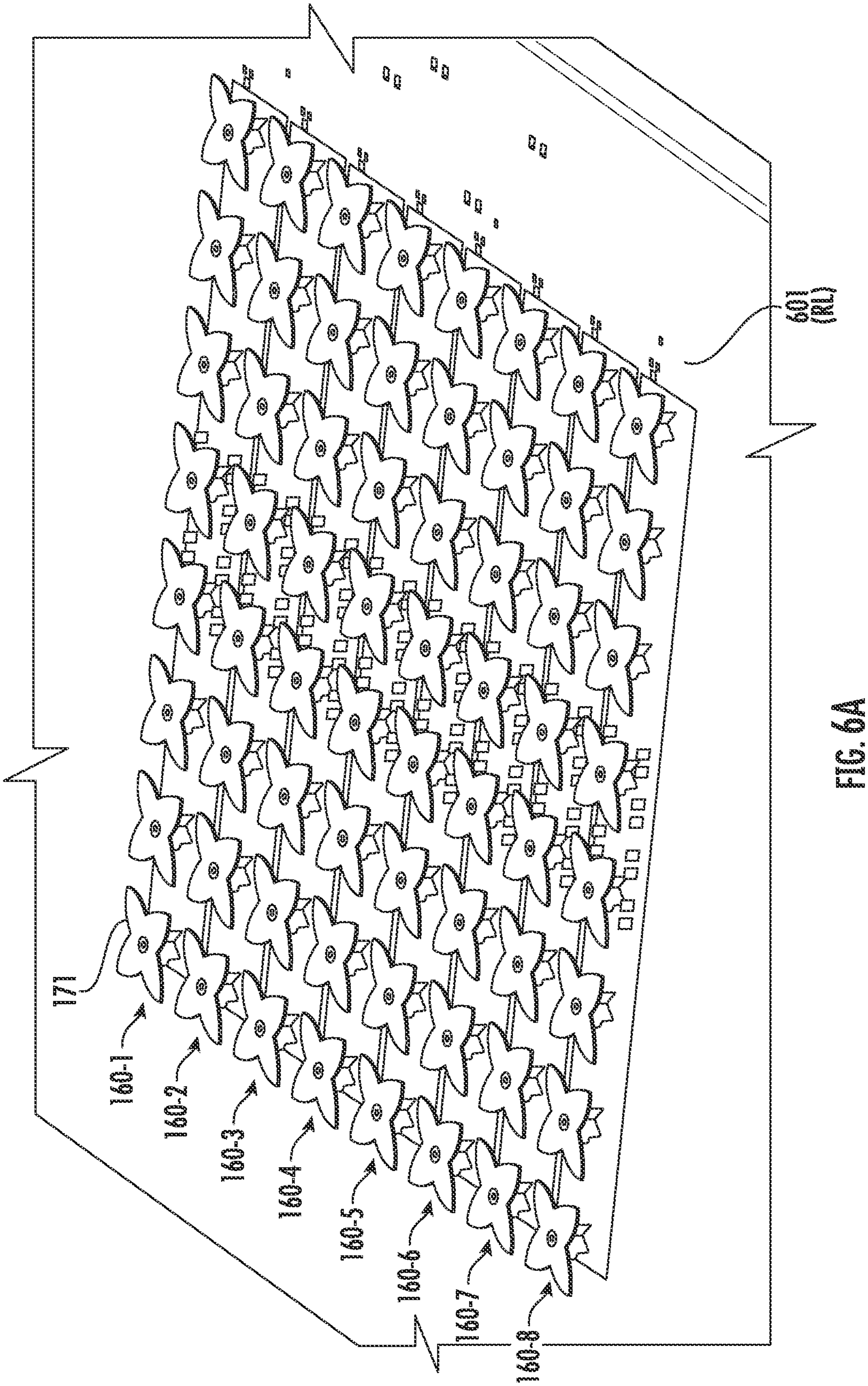
FIG. 6A is an example front perspective view of a portion of the reflector of FIG. 1A that includes the first array of FIG. 1A.

FIG. 6A is an example front perspective view of a portion of the reflector RL of FIG. 1A that includes the first array 101 of FIG. 1A. As shown in FIG. 6A, the rows 160-1 through 160-8 of the first array 101 each include a plurality of radiating elements 171 that extend upward (e.g., in the direction Z (FIG. 1A)) from a front (e.g., top) surface 601 of the reflector RL. In some embodiments, the front surface 601 may be a flat surface that is entirely in the X-Y plane that is illustrated in FIG. 1A.

Figure 6B:
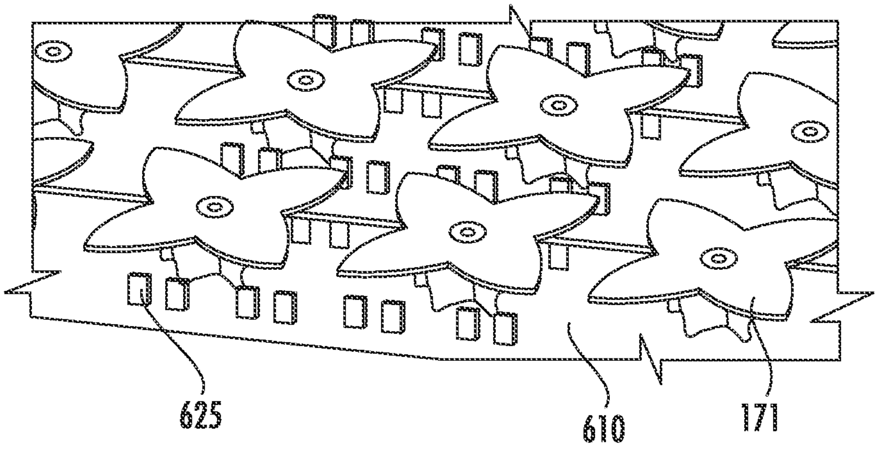
FIG. 6B is an enlarged view of a portion of FIG. 6A.

FIG. 6B is an enlarged view of a portion of FIG. 6A. As shown in FIG. 6B, a plurality of radiating elements 171 may share the same PCB feed board 610. As an example, all radiating elements 171 of a respective row 160 (FIG. 6A) may share the same PCB feed board 610. Thus, a total of eight PCB feed boards 610 may be used to implement the eight rows 160-1 through 160-8, respectively. In another example, all radiating elements 171 of all eight rows 160-1 through 160-8 may share a single PCB feed board.

As illustrated in FIG. 6B, a plurality of protruding portions 625 of another PCB (e.g., a PCB 612 (FIG. 6C)) may be coupled to (e.g., may extend through openings in) a PCB feed board 610. For example, the other PCB may be on an opposite side of the reflector RL (FIG. 6A) from the PCB feed board 610, and may extend forward (e.g., upward in the direction Z (FIG. 1A)) through the reflector RL and the PCB feed board 610. In some embodiments, a Butler matrix 220 (FIG. 2A) of the second stage 202 (FIG. 2A) of the first beamforming network 151 (FIG. 2A) may be implemented on the other PCB. The Butler matrix 220 may thus be coupled to the PCB feed board 610 directly by the other PCB rather than by any cables. As an example, the protruding portions 625 of the other PCB may contact the PCB feed board 610, and the two PCBs may be electrically connected to each other through solder-joint connections.

Figure 6C:
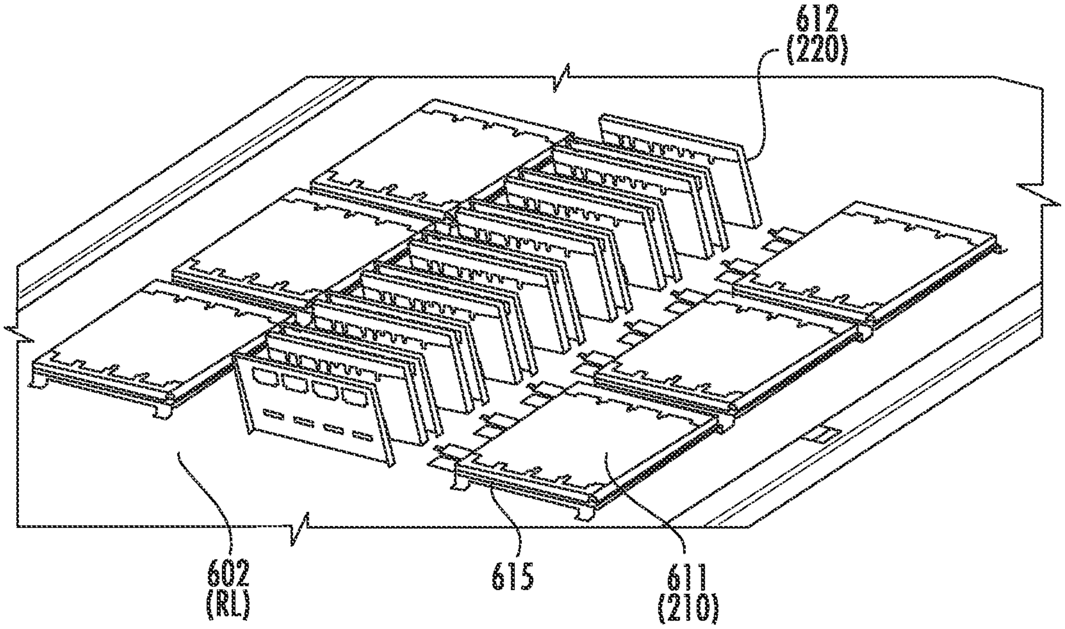
FIG. 6C is an example rear perspective view of the reflector of FIG. 1A.

FIG. 6C is an example rear perspective view of the reflector RL of FIG. 1A. As shown in FIG. 6C, a rear surface 602 of the reflector RL may have a plurality of PCBs thereon (and may be opposite the front surface 601 that is shown in FIG. 6A). For example, the sixteen Butler matrices 220-1 through 220-16 that are shown in FIGS. 2B and 2C may be implemented on sixteen PCBs 612, respectively. The sixteen PCBs 612 may be extended through the reflector RL and may be coupled to the eight rows 160-1 through 160-8 (e.g., via protruding portions 625 (FIG. 6B) of the PCBs 612 rather than via any cables). Each row 160 may be coupled to a respective pair of the PCBs 612 (one PCB 612 per polarization).

Butler matrices 210 (FIG. 2A) of the first stage 201 (FIG. 2A) of the first beamforming network 151 (FIG. 2A) may be implemented on respective PCBs 611 that are on the second surface 602 of the reflector RL. As an example, the twelve Butler matrices 210-1 through 210-12 that are shown in FIGS. 2B and 2C may be implemented on twelve PCBs 611, respectively. In some embodiments, the PCBs 611 may be on respective stackable metal support structures (e.g., metal plates) 615. Accordingly, six groups of two stacked PCBs 611 (e.g., a first-polarization PCB and a corresponding second-polarization PCB) may be on the second surface 602.

The PCBs 611 and 612 may be referred to herein as "first" PCBs and "second" PCBs, respectively. In some embodiments, the first PCBs 611 may be parallel to the second surface 602 of the reflector RL, and the second PCBs 612 may be perpendicular to the second surface 602. In other embodiments, the first PCBs 611 and the second PCBs 612 may all be perpendicular to the second surface 602. The twelve first PCBs 611 may be coupled to the sixteen second PCBs 612 via outputs of the Butler matrices 210 and inputs of the Butler matrices 220 as described herein with respect to FIGS. 3B and 3C. According to some embodiments, the first PCBs 611 may be coupled to the second PCBs 612 by RF transmission lines, such as cables.

In other embodiments, a single PCB may have multiple Butler matrices 210 and/or multiple Butler matrices 220 thereon. For example, referring to FIG. 2B, the eight Butler matrices 220-1 through 220-8 may share a PCB with the six Butler matrices 210-1 through 210-6.

Figure 6D:
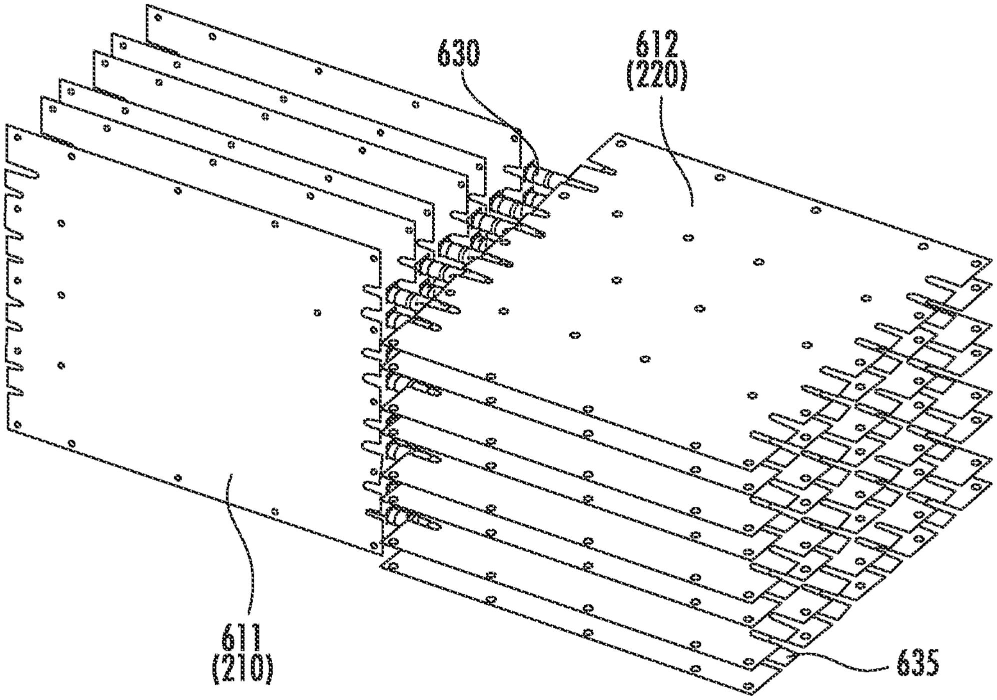
FIG. 6D is a side perspective view of coaxial connectors that couple together PCBs comprising Butler matrices of the two stages of FIG. 2A.

FIG. 6D is a side perspective view of coaxial connectors 630 that couple together PCBs 611, 612 comprising Butler matrices 210, 220 of the two stages 201, 202 of FIG. 2A. Unlike, FIG. 6C, which shows the first and second PCBs 611, 612 being distributed across a larger footprint of the second surface 602 of the reflector RL, FIG. 6D illustrates that six first PCBs 611 may be stacked with each other in a first direction (e.g., the direction X or the direction Y (FIG. 1A)) that is parallel to the second surface 602, and may each be coupled via coaxial connectors 630 to eight second PCBs 612 that may be stacked with each other in a second direction (e.g., a different one of the direction X or the direction Y) that is parallel to the second surface 602.

In some embodiments, the second PCBs 612 may include a plurality of protruding portions 635 that are configured to be coupled to radiating elements 171 (FIG. 6A). For example, the protruding portions 635 may extend through openings in a PCB feed board 610 as described with respect to the protruding portions 625 that are shown in FIG. 6B.

For simplicity of illustration, PCBs for only one polarization are shown in FIG. 6D. As an example, the six first PCBs 611 and eight second PCBs 612 may all be first-polarization PCBs. Accordingly, an additional six first PCBs 611 may be coupled to an additional eight second PCBs 612 via coaxial connectors 630, where the additional fourteen PCBs are all second-polarization PCBs.

Figure 6E:
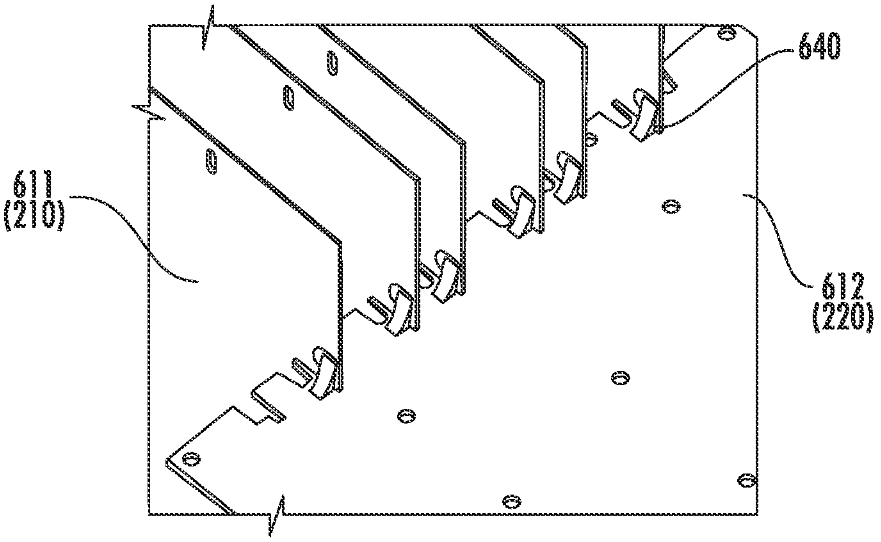
FIG. 6E is a perspective view of Butler matrices of the two stages of FIG. 2A that are soldered together.

FIG. 6E is a perspective view of Butler matrices 210, 220 of the two stages 201, 202 of FIG. 2A that are soldered together. As shown in FIG. 6E, solder joints 640 may connect the first PCBs 611 (on which the Butler matrices 210 are implemented) to the second PCBs 612 (on which the Butler matrices 220 are implemented). In some embodiments, six first PCBs 611 may each be soldered to eight second PCBs 612. Accordingly, solder joints 640 may be used instead of the coaxial connectors 630 that are shown in FIG. 6D. Moreover, the six first PCBs 611 may be stacked with each other, and the eight second PCBs 612 may be stacked with each other, as described herein with respect to FIG. 6D.

Figure 6F:
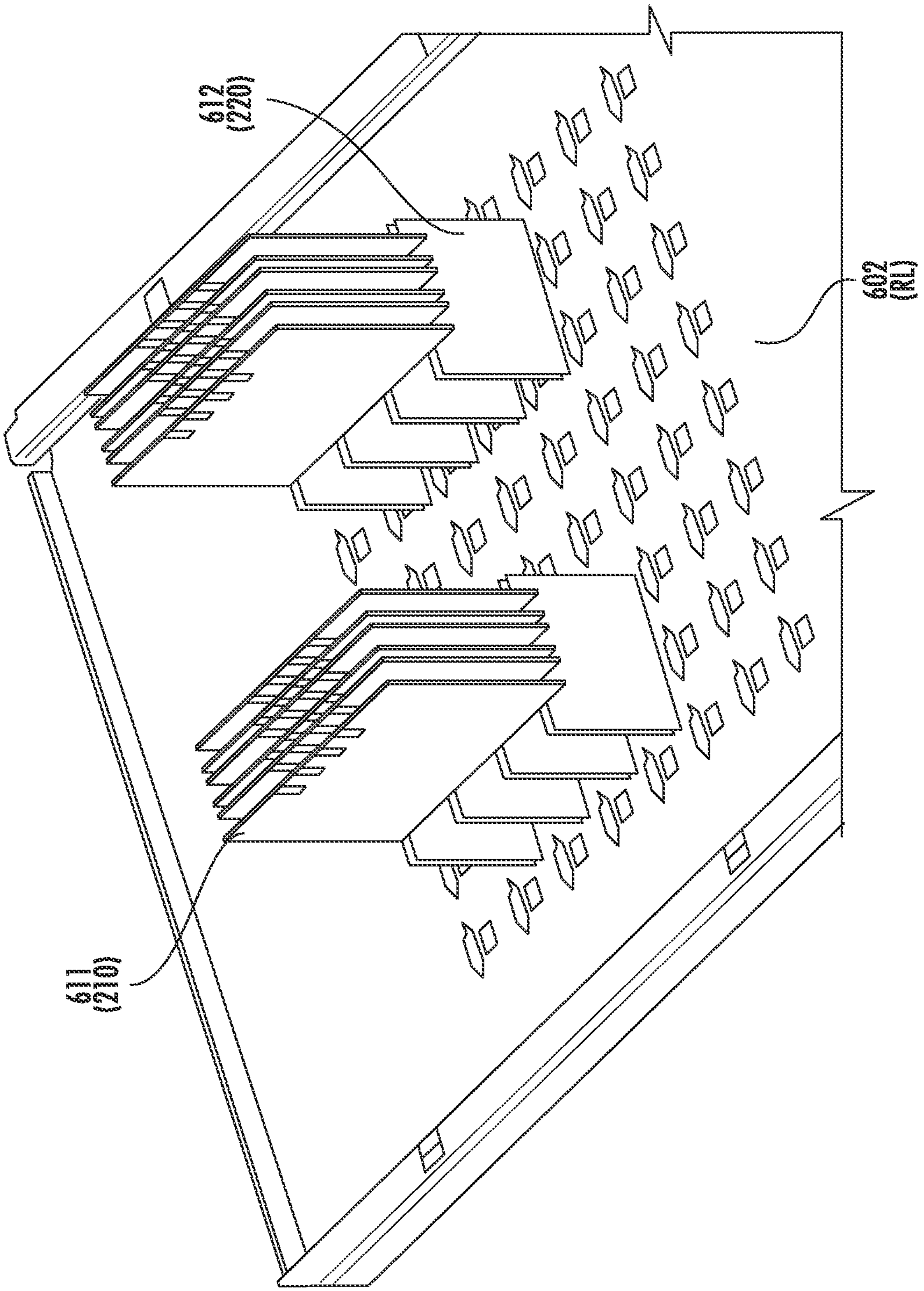
FIG. 6F is another example rear perspective view of the reflector of FIG. 1A.

FIG. 6F is another example rear perspective view of the reflector RL of FIG. 1A. In contrast with the arrangement of PCBs 611, 612 shown in FIG. 6C, FIG. 6F shows that two groups (one per polarization) of six first PCBs 611 may be perpendicular to the second surface 602 of the reflector RL, and may be stacked with each other in a direction that is parallel to the second surface 602. Moreover, two groups (one per polarization) of eight second PCBs 612 may be perpendicular to the second surface 602 and perpendicular to the first PCBs 611. One group (e.g., a first-polarization group) of six first PCBs 611 may be stacked on a group of eight second PCBs 612, and another group (e.g., a second-polarization group) of six first PCBs 611 may be stacked on another group of eight second PCBs 612. The first PCBs 611 may be coupled to the second PCBs 612 by, for example, coaxial connectors 630 (FIG. 6D) or solder joints 640 (FIG. 6E).

Accordingly, the first PCBs 611 may be coupled to the second PCBs 612 without any cables therebetween, thereby reducing the size and weight of the antenna 100 (FIG. 1A). Moreover, the second PCBs 612 may be coupled to the rows 160 (FIG. 6A) by protruding portions 625 (FIG. 6B), or protruding portions 635 (FIG. 6D), of the PCBs 612 and thus without any cables between the rows 160 and the PCBs 612.

Figure 6G:
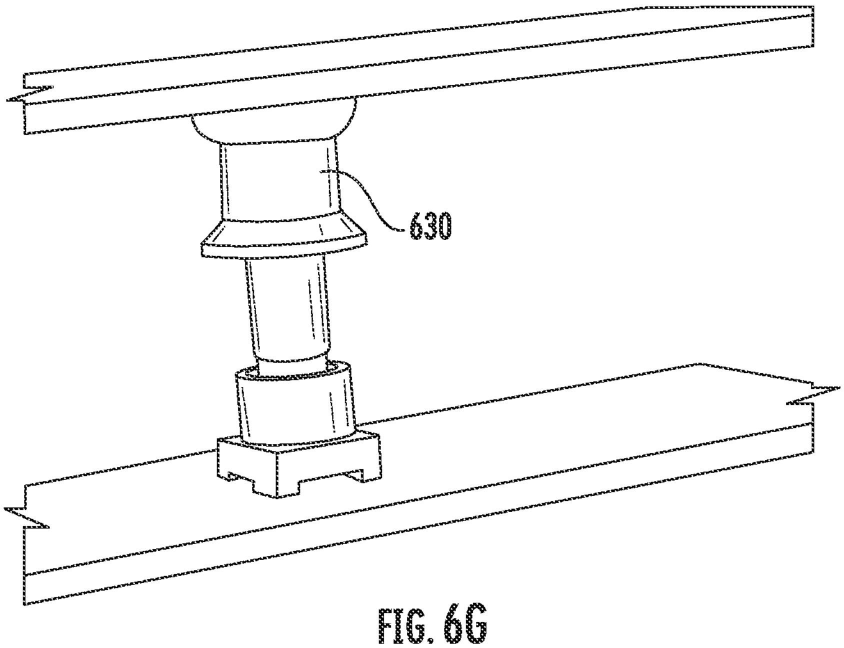
FIG. 6G is an enlarged side perspective view of one of the coaxial connectors of FIG. 6D.

FIG. 6G is an enlarged side perspective view of one of the coaxial connectors 630 of FIG. 6D. Coaxial connectors 630 are an example implementation of blind-mate connections that may be used to couple the first PCBs 611 (FIG. 6F) to the second PCBs 612 (FIG. 6F). In some embodiments, a first portion of the coaxial connector 630 may be attached to one of the first PCBs 611, and a second portion of the coaxial connector 630 that mates with the first portion may be attached to one of the second PCBs 612 (FIG. 6F).

Figure 6H:
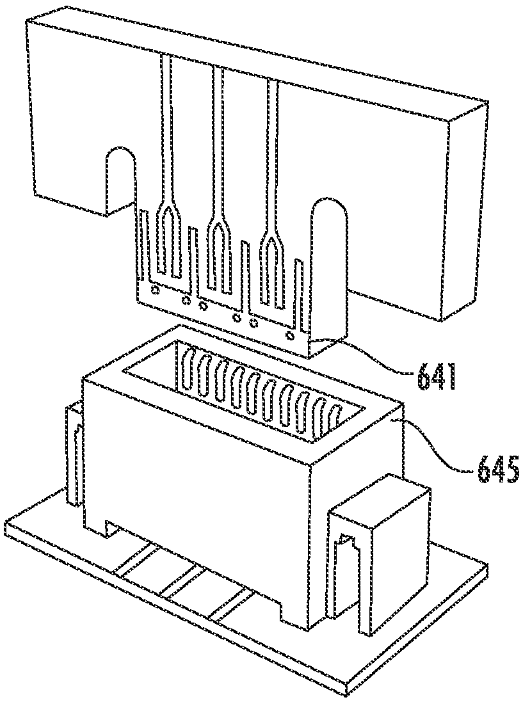
FIG. 6H is a side perspective view of a flat connector.

FIG. 6H is a side perspective view of a flat connector 641. A connector block 645 may have an interior portion that is configured to receive, and to thereby be electrically connected to, the flat connector 641. For example, one or more rows of metal pins may be in the interior portion of the block 645. In some embodiments, the flat connector 641 may be part of, or may be attached to, one of the first PCBs 611. Moreover, the block 645 may be attached to one of the second PCBs 612. In other embodiments, the flat connector 641 may be part of, or attached to, one of the second PCBs 612, and the block 645 may be attached to one of the first PCBs 611.

Figure 6I:
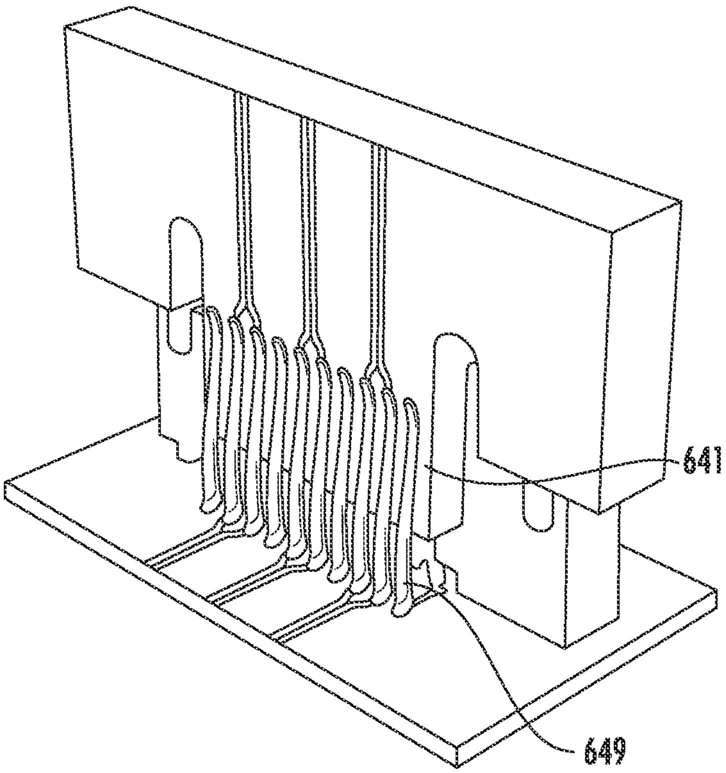
FIG. 6I is a side perspective view of metal pins that are coupled to the flat connector of FIG. 6H.

FIG. 6I is a side perspective view of metal pins 649 that are coupled to the flat connector 641 of FIG. 6H. The metal pins 649 are configured to receive, and to thereby be electrically connected to, the flat connector 641. For example, the metal pins 649 may contact the flat connector 641. In some embodiments, the flat connector 641 may be part of, or attached to, one of the first PCBs 611, and the metal pins 649 may be attached to (e.g., may protrude perpendicularly from a main surface of) one of the second PCBs 612. In other embodiments, the flat connector 641 may be part of, or attached to, one of the second PCBs 612, and the metal pins 649 may be attached to one of the first PCBs 611.

Figure 6J:
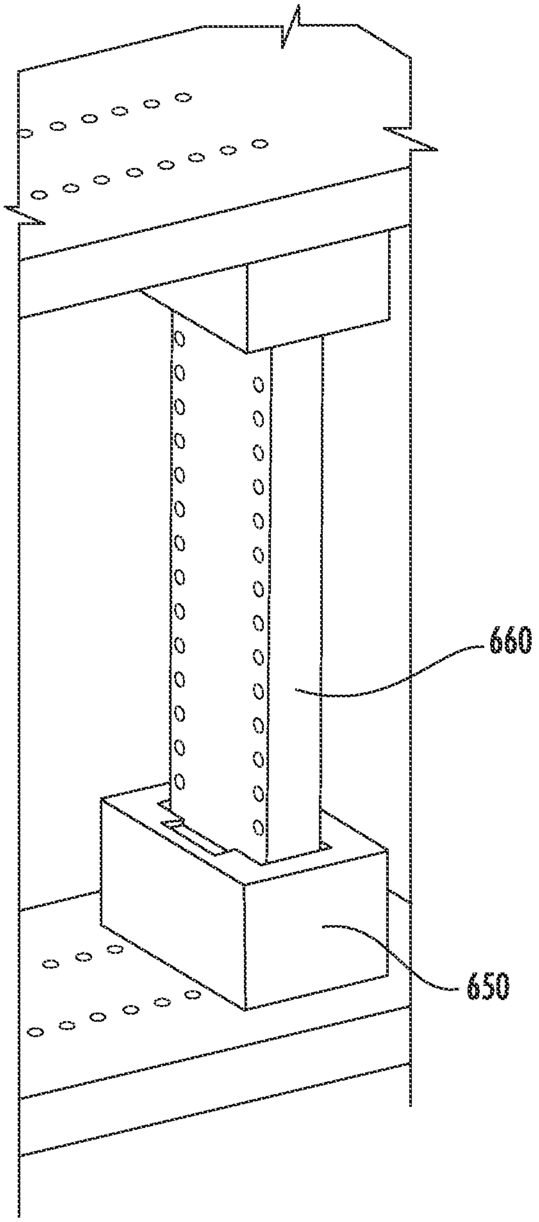
FIG. 6J is a side perspective view of a PCB connector that is received by two plastic supports.

FIG. 6J is a side perspective view of a PCB connector 660 that is received by two plastic supports 650. As an example, the PCB connector 660 may comprise a PCB having a first end that is received by, and electrically connected to, an interior portion of a first of the plastic supports 650, and a second end that is opposite the first end and is received by, and electrically connected to, an interior portion of a second of the plastic supports 650. In some embodiments, the first of the plastic supports 650 may be attached to one of the first PCBs 611, and the second of the plastic supports 650 may be attached to one of the second PCBs 612.

Figure 6K:
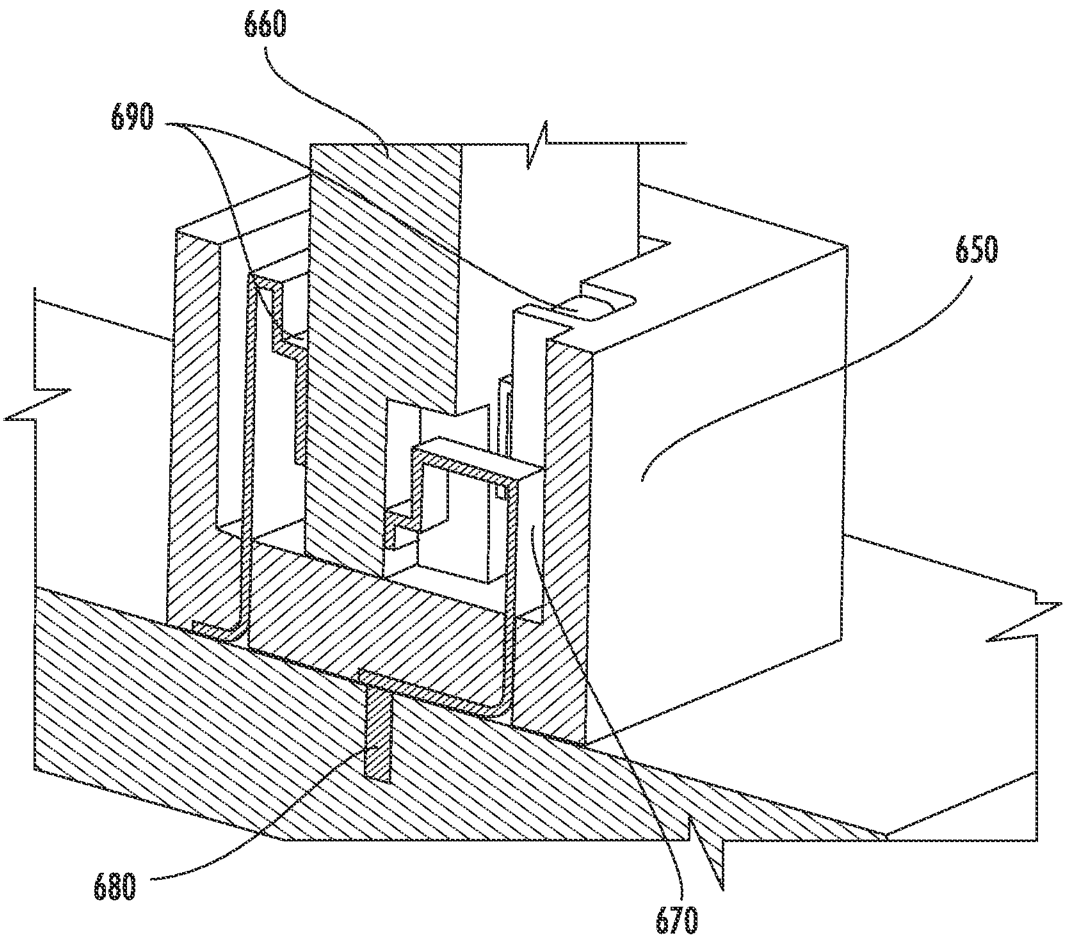
FIG. 6K is a side perspective view of the inside of one of the plastic supports of FIG. 6J.

FIG. 6K is a side perspective view of the inside of one of the plastic supports 650 of FIG. 6J. As shown in FIG. 6K, the interior of the plastic support 650 may include a central spring finger 670 that is electrically connected to an end portion of the PCB connector 660. The central spring finger 670 may be configured to hold the end portion of the PCB connector 660 in place, and to release the end portion of the PCB connector 660 upon movement of the central spring finger 670. In some embodiments, the central spring finger 670 may be electrically connected to a PCB (e.g., one of the first PCBs 611 or one of the second PCBs 612) via a hole 680 (e.g., a plated through hole) to a central track of the PCB. Moreover, the interior of the plastic support 650 may include a plurality of grounding spring fingers 690 that are coupled to the PCB connector 660 and to electrical ground.

Accordingly, FIGS. 6D-6K show various non-cable options for connecting the first PCBs 611 to the second PCBs 612. In other embodiments, however, the first PCBs 611 may be connected to the second PCBs 612 by cables.

Antennas 100 (FIG. 1A) according to embodiments of the present invention may provide a number of advantages. These advantages include reducing size and weight by using a flat reflector RL (FIG. 1A) and/or by using fewer cables.

For example, the flat reflector RL may be significantly smaller than a pyramid-shaped slanted reflector. In some embodiments, the flat reflector RL may be flat on the ground and may provide ground-to-air communications.

As another example, beamforming networks 151, 152 (FIG. 1B) of the antenna 100 may be coupled to arrays 101, 102 (FIG. 1B) without any cables therebetween. For example, Butler matrices 220 (FIG. 2A) of the second stage 202 (FIG. 2A) of the first beamforming network 151 may be implemented on PCBs 612 (FIG. 6F) that may be coupled to sub-arrays (e.g., rows 160 (FIG. 1C)) of the first array 101 by protruding portions 625 (FIG. 6B), or protruding portions 635 (FIG. 6D), of the PCBs 612 rather than by cables. Moreover, the beamforming networks 151, 152 may be multi-stage beamforming networks that do not use any cables between the different stages thereof.

The present invention has been described above with reference to the accompanying drawings. The present invention is not limited to the illustrated embodiments. Rather, these embodiments are intended to fully and completely disclose the present invention to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," "coupled," and the like can mean either direct or indirect attachment or coupling between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. An antenna comprising:

an antenna array having a plurality of sub-arrays that each comprise a plurality of radiating elements; and a multi-stage beamforming network having a first stage comprising a plurality of first Butler matrices and a second stage comprising a plurality of second Butler matrices that are coupled between the first Butler matrices and the sub-arrays, wherein the first Butler matrices are each coupled to each of the second Butler matrices, wherein the second Butler matrices are coupled to respective ones of the plurality of sub-arrays using conductors other than cables between the second Butler matrices and the sub-arrays, wherein the antenna array is on a first surface of a flat reflector, and wherein the multi-stage beamforming network is on a second surface of the flat reflector opposite the first surface.

2. The antenna of claim 1, wherein the multi-stage beamforming network has fewer of the first Butler matrices than the second Butler matrices.

3. The antenna of claim 2, wherein each of the second Butler matrices has an outermost input that is coupled to a resistive load.

4. The antenna of claim 1, wherein the first Butler matrices are on respective first printed circuit boards (PCBs) that are parallel or perpendicular to the second surface of the flat reflector, and wherein the second Butler matrices are on respective second PCBs that are perpendicular to the second surface of the flat reflector.

5. The antenna of claim 4, wherein the first PCBs are coupled to the second PCBs by solder or by blind-mate connections.

6. The antenna of claim 1, wherein the antenna array is configured to provide ground-to-air communications.

7. The antenna of claim 1, wherein the antenna array comprises a first antenna array, the sub-arrays comprise first sub-arrays, the radiating elements comprise first-band radiating elements, and the multi-stage beamforming network comprises a first multi-stage beamforming network, and wherein the antenna further comprises:

a second antenna array having a plurality of second sub-arrays that each comprise a plurality of second-band radiating elements; and a second multi-stage beamforming network comprising a plurality of third Butler matrices and a plurality of fourth Butler matrices coupled between the third Butler matrices and the second sub-arrays.

8. The antenna of claim 7, wherein the first and second antenna arrays are each on the flat reflector.

9. The antenna of claim 8, wherein a first of the second sub-arrays is between a first and a second of the first sub-arrays on the flat reflector.

10. The antenna of claim 8, wherein the flat reflector has a length of greater than zero and less than or equal to 1,200 millimeters (mm) and a width of greater than zero and less than or equal to 865 mm.

11. The antenna of claim 7, wherein the second antenna array is configured to provide an equal number of antenna beams as the first antenna array.

12. The antenna of claim 7, wherein the first through fourth Butler matrices are first-polarization Butler matrices, and wherein the antenna further comprises a plurality of second-polarization Butler matrices comprising:

a plurality of fifth Butler matrices and a plurality of sixth Butler matrices coupled between the fifth Butler matrices and the first sub-arrays; and a plurality of seventh Butler matrices and a plurality of eighth Butler matrices coupled between the seventh Butler matrices and the second sub-arrays.

13. A method of operating an antenna, the method comprising:

providing the antenna comprising an antenna array having a plurality of sub-arrays and a multi-stage beamforming network coupled to the sub-arrays, each of the plurality of sub-arrays comprising a plurality of radiating elements on a flat reflector of the antenna; and providing ground-to-air communications via the antenna array.

14. The method of claim 13, wherein the multi-stage beamforming network has a first stage comprising a plurality of first Butler matrices and a second stage comprising a plurality of second Butler matrices that are coupled between the first Butler matrices and the sub-arrays, wherein the first Butler matrices are each coupled to each of the second Butler matrices, and wherein the second Butler matrices are coupled to the sub-arrays, respectively, without any cables between the second Butler matrices and the sub-arrays.

15. The method of claim 13, wherein the antenna comprises a multi-band ground-to-air antenna and the antenna array comprises a first antenna array, wherein providing the ground-to-air communications comprises providing N×N antenna beams per polarization in a first frequency band via the first antenna array, wherein the method further comprises providing N×N antenna beams per polarization in a second frequency band via a second antenna array, and wherein Nis an integer comprising 5 or higher.

16. An antenna comprising:

a flat reflector;

an antenna array having a plurality of sub-arrays that each comprise a plurality of radiating elements on a first surface of the flat reflector; and a multi-stage beamforming network on a second surface of the flat reflector that is opposite the first surface, the multi-stage beamforming network having a first stage comprising a plurality of first Butler matrices and a second stage comprising a plurality of second Butler matrices that are coupled between the first Butler matrices and the sub-arrays, wherein the first Butler matrices are on respective first printed circuit boards (PCBs) that are parallel or perpendicular to the second surface of the flat reflector, and wherein the second Butler matrices are on respective second PCBs that are perpendicular to the second surface of the flat reflector.

17. The antenna of claim 16, wherein the first PCBs are coupled to the second PCBs by solder or by blind-mate connections.

18. The antenna of claim 16, wherein the second PCBs are stacked with each other in a first direction parallel to the second surface of the flat reflector.

19. The antenna of claim 18, wherein the first PCBs are stacked with each other in a second direction parallel to the second surface of the flat reflector and perpendicular to the first direction.

* * * * *